United States Patent
Lyu et al.

(10) Patent No.: US 12,372,747 B2
(45) Date of Patent: Jul. 29, 2025

(54) OPTICAL IMAGING LENS ASSEMBLY

(71) Applicant: ZHEJIANG SUNNY OPTICS CO., LTD., Yuyao Zhejiang (CN)

(72) Inventors: Saifeng Lyu, Yuyao Zhejiang (CN); Fujian Dai, Yuyao Zhejiang (CN); Liefeng Zhao, Yuyao Zhejiang (CN)

(73) Assignee: ZHEJIANG SUNNY OPTICS CO., LTD., Yuyao Zhejiang (CN)

( * ) Notice: Subject to any disclaimer, the term of this patent is extended or adjusted under 35 U.S.C. 154(b) by 763 days.

(21) Appl. No.: 17/559,052

(22) Filed: Dec. 22, 2021

(65) Prior Publication Data
US 2022/0229272 A1  Jul. 21, 2022

(30) Foreign Application Priority Data
Jan. 20, 2021 (CN) .......................... 202110073950.7

(51) Int. Cl.
*G02B 13/00* (2006.01)
*G02B 9/64* (2006.01)
*G03B 30/00* (2021.01)

(52) U.S. Cl.
CPC ........... *G02B 9/64* (2013.01); *G02B 13/0045* (2013.01)

(58) Field of Classification Search
CPC ............................... G02B 9/64; G02B 13/0045
USPC .......................................................... 359/755
See application file for complete search history.

(56) References Cited

U.S. PATENT DOCUMENTS

| | | |
|---|---|---|
| 11,150,445 B2 | 10/2021 | Sekine |
| 11,754,810 B2 * | 9/2023 | Peng .................. G02B 9/64 359/714 |
| 2015/0103414 A1* | 4/2015 | Baik .................. G02B 13/0045 359/755 |
| 2017/0059827 A1* | 3/2017 | Kubota .................. G02B 9/64 |
| 2019/0369360 A1 | 12/2019 | Jung et al. |
| 2020/0393654 A1 | 12/2020 | Shin et al. |

(Continued)

FOREIGN PATENT DOCUMENTS

| | | |
|---|---|---|
| CN | 107367827 A | 11/2017 |
| CN | 211014808 U | 7/2020 |

(Continued)

OTHER PUBLICATIONS

Office Action issued on Apr. 13, 2023 in connection with Chinese patent No. 202210629633.3.

*Primary Examiner* — Ricky L Mack
*Assistant Examiner* — Elizabeth M Hall
(74) *Attorney, Agent, or Firm* — Norris McLaughlin, PA

(57) ABSTRACT

Embodiments of the present disclosure provide an optical imaging lens assembly, which comprises, sequentially along an optical axis from an object side to an image side: a first lens, having a positive refractive power; a second lens, having a negative refractive power; a third lens, having a positive refractive power; a fourth lens, having a negative refractive power; a fifth lens, having a positive refractive power; a sixth lens, having a positive refractive power; and a seventh lens, having a negative refractive power. A total effective focal length f of the optical imaging lens assembly and half of a maximal field-of-view Semi-FOV of the optical imaging lens assembly satisfy: f×tan(Semi-FOV)≥5.0 mm; and a center thickness CT1 of the first lens on the optical axis and an edge thickness ET1 of the first lens satisfy: 1.5<CT1/ET1<2.0.

15 Claims, 9 Drawing Sheets

(56) References Cited

U.S. PATENT DOCUMENTS

| | | | |
|---|---|---|---|
| 2021/0048611 A1* | 2/2021 | Jung | .................. G02B 13/0045 |
| 2021/0396962 A1 | 12/2021 | Nitta et al. | |
| 2022/0011549 A1* | 1/2022 | Peng | ...................... G02B 13/06 |

FOREIGN PATENT DOCUMENTS

| CN | 211086744 U | | 7/2020 | |
|---|---|---|---|---|
| CN | 111538142 A | * | 8/2020 | ......... G02B 13/0045 |
| CN | 111722365 A | | 9/2020 | |
| CN | 212009121 U1 | | 11/2020 | |
| JP | 2019070733 A | | 5/2019 | |

* cited by examiner

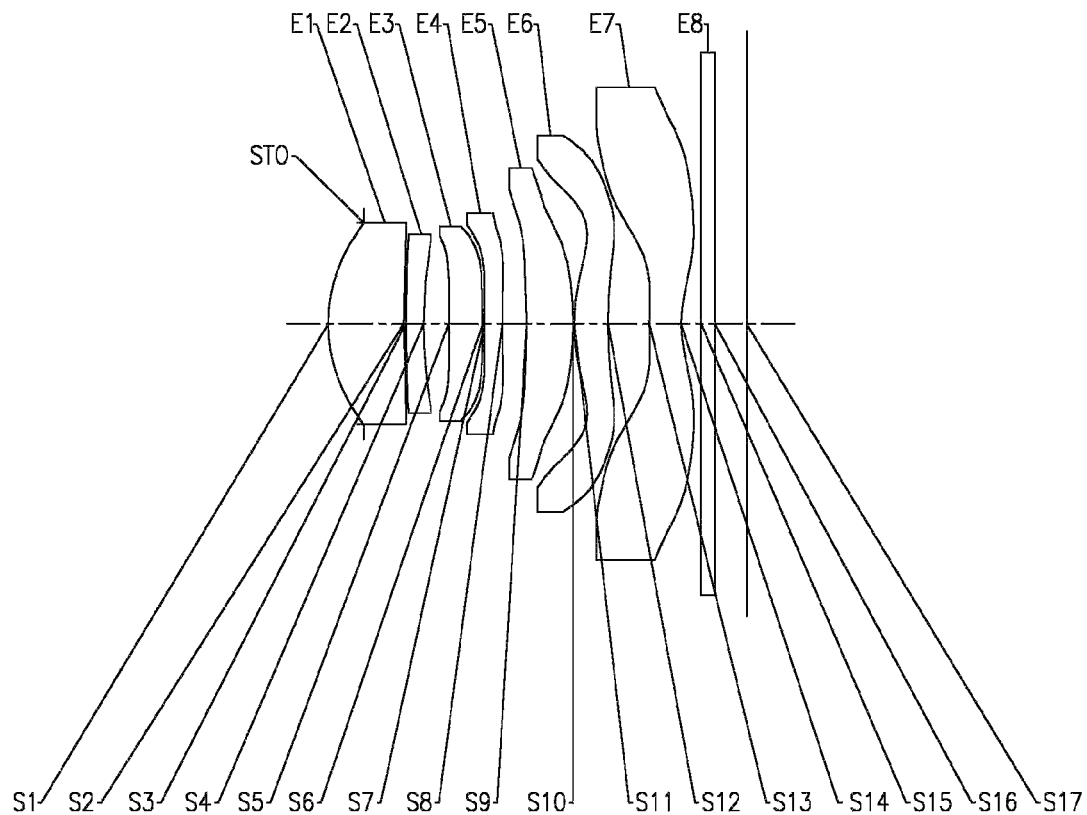
Fig. 9
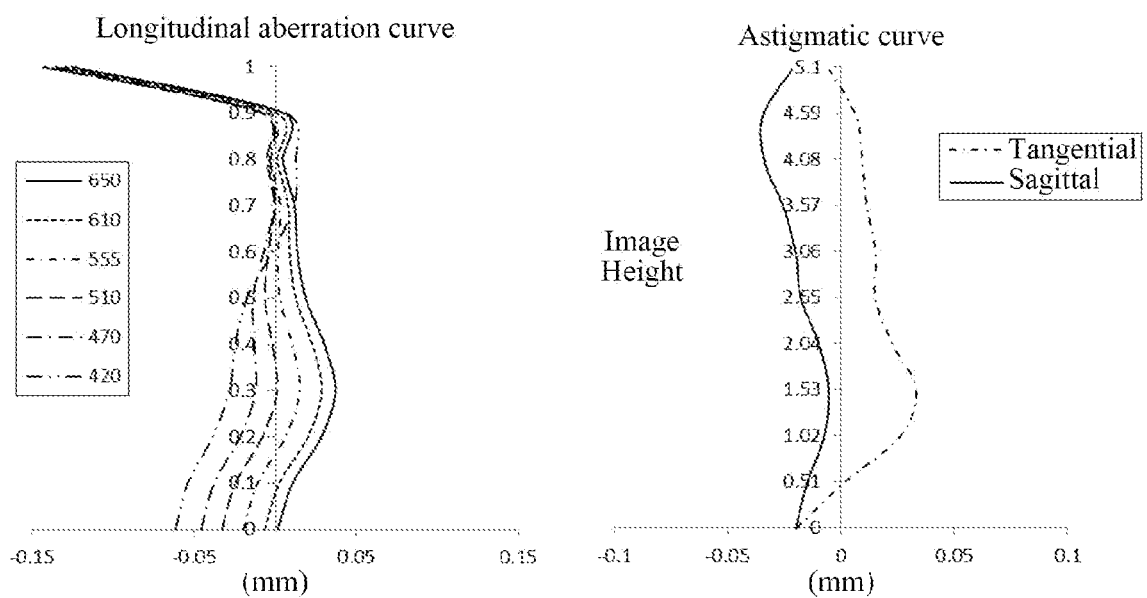
Fig. 10A
Fig. 10B

OPTICAL IMAGING LENS ASSEMBLY

CROSS-REFERENCE TO RELATED APPLICATIONS

This application claims the priority from Chinese Patent Application No. 202110073950.7, filed in the National Intellectual Property Administration (CNIPA) on Jan. 20, 2021, the contents of which are hereby incorporated by reference in their entirety.

TECHNICAL FIELD

The present disclosure relates to the field of optical element, and particularly to an optical imaging lens assembly.

BACKGROUND

With the development of optical imaging lens assembly in the lens assembly field, the imaging quality of optical imaging lens assemblies mounted on portable electronic products such as smart phones is getting higher and higher. An optical imaging lens assembly with high imaging quality has become the standard configuration of high-end smartphones. Therefore, in order to improve the competitiveness of products, major mobile phone manufacturers have put forward more and higher requirements on the imaging performance of optical imaging lens assemblies mounted on smart phones.

In order to meet the needs of the market, lens assembly designers have gradually begun to study how to reduce the internal total reflection of the lens assembly, to avoid ghosting, increase the pixel size and relative illuminance, and reduce distortion of a lens assembly, etc., by reasonably setting the refractive power and key technical parameters of the lenses.

SUMMARY

Some embodiments of an aspect of the present disclosure provide an optical imaging lens assembly, which comprises, sequentially along an optical axis from an object side to an image side: a first lens, having a positive refractive power; a second lens, having a negative refractive power; a third lens, having a positive refractive power; a fourth lens, having a negative refractive power; a fifth lens, having a positive refractive power; a sixth lens, having a positive refractive power; and a seventh lens, having a negative refractive power. A total effective focal length f of the optical imaging lens assembly and half of a maximal field-of-view Semi-FOV of the optical imaging lens assembly may satisfy: f×tan(Semi-FOV)≥5.0 mm, and a center thickness CT1 of the first lens on the optical axis and an edge thickness ET1 of the first lens may satisfy: $1.5 < CT1/ET1 < 2.0$.

According to an implementation of the present disclosure, at least one of the surfaces from the object-side surface of the first lens to the image-side surface of the seventh lens is an aspheric surface.

According to an implementation of the present disclosure, an entrance pupil diameter EPD of the optical imaging lens assembly and a center thickness CT1 of the first lens on the optical axis may satisfy: $2.3 \leq EPD/CT1 < 3.0$.

According to an implementation of the present disclosure, an effective focal length f7 of the seventh lens, a radius of curvature R13 of the object-side surface of the seventh lens, and a radius of curvature R14 of the image-side surface of the seventh lens may satisfy: $-1.5 < f7/(R13-R14) < -0.5$.

According to an implementation of the present disclosure, an effective focal length f6 of the sixth lens, a radius of curvature R11 of the object-side surface of the sixth lens, and a radius of curvature R12 of the image-side surface of the sixth lens may satisfy: $1.5 \leq f6/R11 - f6/R12 < 2.0$.

According to an implementation of the present disclosure, an effective focal length f1 of the first lens and a combined focal length f12 of the first lens and the second lens may satisfy: $1.0 < f12/f1 < 1.5$.

According to an implementation of the present disclosure, an effective focal length f2 of the second lens and an effective focal length f3 of the third lens may satisfy: $-2.0 < f2/f3 \leq -1.5$.

According to an implementation of the present disclosure, a total effective focal length f of the optical imaging lens assembly, an effective focal length f5 of the fifth lens, and an effective focal length f6 of the sixth lens may satisfy: $|f/f5 - f/f6| < 0.3$.

According to an implementation of the present disclosure, a combined focal length f56 of the fifth lens and the sixth lens and an effective focal length f7 of the seventh lens may satisfy: $-3.0 < f56/f7 \leq -1.4$.

According to an implementation of the present disclosure, a center thickness CT6 of the sixth lens on the optical axis, a spacing distance T56 between the fifth lens and the sixth lens on the optical axis, and a distance SAG62 on the optical axis from an intersection point of an image-side surface of the sixth lens and the optical axis to a vertex of a maximal effective radius of the image-side surface of the sixth lens may satisfy: $-1.0 \leq (T56+CT6)/SAG62 < -0.5$.

According to an implementation of the present disclosure, a center thickness CT5 of the fifth lens on the optical axis, a spacing distance T56 between the fifth lens and the sixth lens on the optical axis, and a distance SAG61 on the optical axis from an intersection point of an object-side surface of the sixth lens and the optical axis to a vertex of a maximal effective radius of the object-side surface of the sixth lens may satisfy: $-1.5 < CT5/(SAG61+T56) \leq -0.8$.

According to an implementation of the present disclosure, a distance SAG71 on the optical axis from an intersection point of an object-side surface of the seventh lens and the optical axis to a vertex of a maximal effective radius of the object-side surface of the seventh lens and a spacing distance T67 between the sixth lens and the seventh lens on the optical axis may satisfy: $-1.6 < SAG71/T67 \leq -1.2$.

According to an implementation of the present disclosure, a center thickness CT3 of the third lens on the optical axis and a center thickness CT4 of the fourth lens on the optical axis may satisfy: $1.6 < CT3/CT4 < 2.0$.

Another aspect of the present disclosure is to provide, a spacing distance T23 between the second lens and the third lens on the optical axis, a spacing distance T45 between the fourth lens and the fifth lens on the optical axis, a spacing distance T67 between the sixth lens and the seventh lens on the optical axis, and a sum ΣAT of spacing distances between any two adjacent lenses in the first to seventh lenses on the optical axis may satisfy: $0.8 < (T23+T45+T67)/\Sigma AT < 1.0$.

According to an implementation of the present disclosure, an effective focal length f5 of the fifth lens, a radius of curvature R9 of the object-side surface of the fifth lens, and a radius of curvature R10 of the image-side surface of the fifth lens may satisfy: $-11.0 < f5/R9 + f5/R10 < -4.5$.

According to an implementation of the present disclosure, a distance TTL from the object-side surface of first lens to the image plane of the optical imaging lens assembly on the optical axis and half of a diagonal length ImgH of an effective pixel area on the image plane of the optical imaging lens assembly may satisfy: ImgH/TTL>0.6.

Some embodiments of another aspect of the present disclosure provide an optical imaging lens assembly, which comprises, sequentially along an optical axis from an object side to an image side: a first lens, having a positive refractive power; a second lens, having a negative refractive power; a third lens, having a positive refractive power; a fourth lens, having a negative refractive power; a fifth lens, having a positive refractive power; a sixth lens, having a positive refractive power; and a seventh lens, having a negative refractive power. A total effective focal length f of the optical imaging lens assembly and half of a maximal field-of-view Semi-FOV of the optical imaging lens assembly may satisfy: f×tan(Semi-FOV)≥5.0 mm; and a spacing distance T23 between the second lens and the third lens on the optical axis, a spacing distance T45 between the fourth lens and the fifth lens on the optical axis, a spacing distance T67 between the sixth lens and the seventh lens on the optical axis, and a sum ΣAT of spacing distances between any two adjacent lenses in the first to seventh lenses on the optical axis may satisfy: 0.8<(T23+T45+T67)/ΣAT<1.0.

According to an implementation of the present disclosure, an entrance pupil diameter EPD of the optical imaging lens assembly and a center thickness CT1 of the first lens on the optical axis may satisfy: 2.3≤EPD/CT1<3.0.

According to an implementation of the present disclosure, an effective focal length f7 of the seventh lens, a radius of curvature R13 of the object-side surface of the seventh lens, and a radius of curvature R14 of the image-side surface of the seventh lens may satisfy: −1.5<f7/(R13−R14)<−0.5.

According to an implementation of the present disclosure, an effective focal length f6 of the sixth lens, a radius of curvature R11 of the object-side surface of the sixth lens, and a radius of curvature R12 of the image-side surface of the sixth lens may satisfy: 1.5≤f6/R11−f6/R12<2.0.

According to an implementation of the present disclosure, an effective focal length f1 of the first lens and a combined focal length f12 of the first lens and the second lens may satisfy: 1.0<f12/f1<1.5.

According to an implementation of the present disclosure, an effective focal length f2 of the second lens and an effective focal length f3 of the third lens may satisfy: −2.0<f2/f3≤−1.5.

According to an implementation of the present disclosure, a total effective focal length f of the optical imaging lens assembly, an effective focal length f5 of the fifth lens, and an effective focal length f6 of the sixth lens may satisfy: |f/f5−f/f6|<0.3.

According to an implementation of the present disclosure, a combined focal length f56 of the fifth lens and the sixth lens and an effective focal length f7 of the seventh lens may satisfy: −3.0<f56/f7≤−1.4.

According to an implementation of the present disclosure, a center thickness CT6 of the sixth lens on the optical axis, a spacing distance T56 between the fifth lens and the sixth lens on the optical axis, and a distance SAG62 on the optical axis from an intersection point of an image-side surface of the sixth lens and the optical axis to a vertex of a maximal effective radius of the image-side surface of the sixth lens may satisfy: −1.0≤(T56+CT6)/SAG62<−0.5.

According to an implementation of the present disclosure, a center thickness CT5 of the fifth lens on the optical axis, a spacing distance T56 between the fifth lens and the sixth lens on the optical axis, and a distance SAG61 on the optical axis from an intersection point of an object-side surface of the sixth lens and the optical axis to a vertex of a maximal effective radius of the object-side surface of the sixth lens may satisfy: −1.5<CT5/(SAG61+T56)≤−0.8.

According to an implementation of the present disclosure, a distance SAG71 on the optical axis from an intersection point of an object-side surface of the seventh lens and the optical axis to a vertex of a maximal effective radius of the object-side surface of the seventh lens and a spacing distance T67 between the sixth lens and the seventh lens on the optical axis may satisfy: −1.6<SAG71/T67≤−1.2.

According to an implementation of the present disclosure, a center thickness CT3 of the third lens on the optical axis and a center thickness CT4 of the fourth lens on the optical axis may satisfy: 1.6<CT3/CT4<2.0.

According to an implementation of the present disclosure, an effective focal length f5 of the fifth lens, a radius of curvature R9 of the object-side surface of the fifth lens, and a radius of curvature R10 of the image-side surface of the fifth lens may satisfy: −11.0<f5/R9+f5/R10<−4.5.

According to an implementation of the present disclosure, a distance TTL from the object-side surface of first lens to the image plane of the optical imaging lens assembly on the optical axis and half of a diagonal length ImgH of an effective pixel area on the image plane of the optical imaging lens assembly may satisfy: ImgH/TTL>0.6.

According to an implementation of the present disclosure, a center thickness CT1 of the first lens on the optical axis and an edge thickness ET1 at a vertex of a maximal effective radius of the first lens may satisfy: 1.5<CT1/ET1<2.0.

The optical imaging lens assembly provided by the present disclosure can have at least one beneficial effect such as high pixels, high illumination, small distortion, and high imaging quality.

BRIEF DESCRIPTION OF THE DRAWINGS

After reading detailed descriptions of non-limiting embodiments given with reference to the following accompanying drawings, other features, objectives and advantages of the present disclosure will become more apparent:

FIG. 9 is a schematic structural diagram of an optical imaging lens assembly according to Embodiment 5 of the present disclosure;

FIGS. 10A to 10D respectively show a longitudinal aberration curve, an astigmatic curve, a distortion curve and a lateral color curve of the optical imaging lens assembly according to Embodiment 5;

DETAILED DESCRIPTION OF EMBODIMENTS

Figure 1:
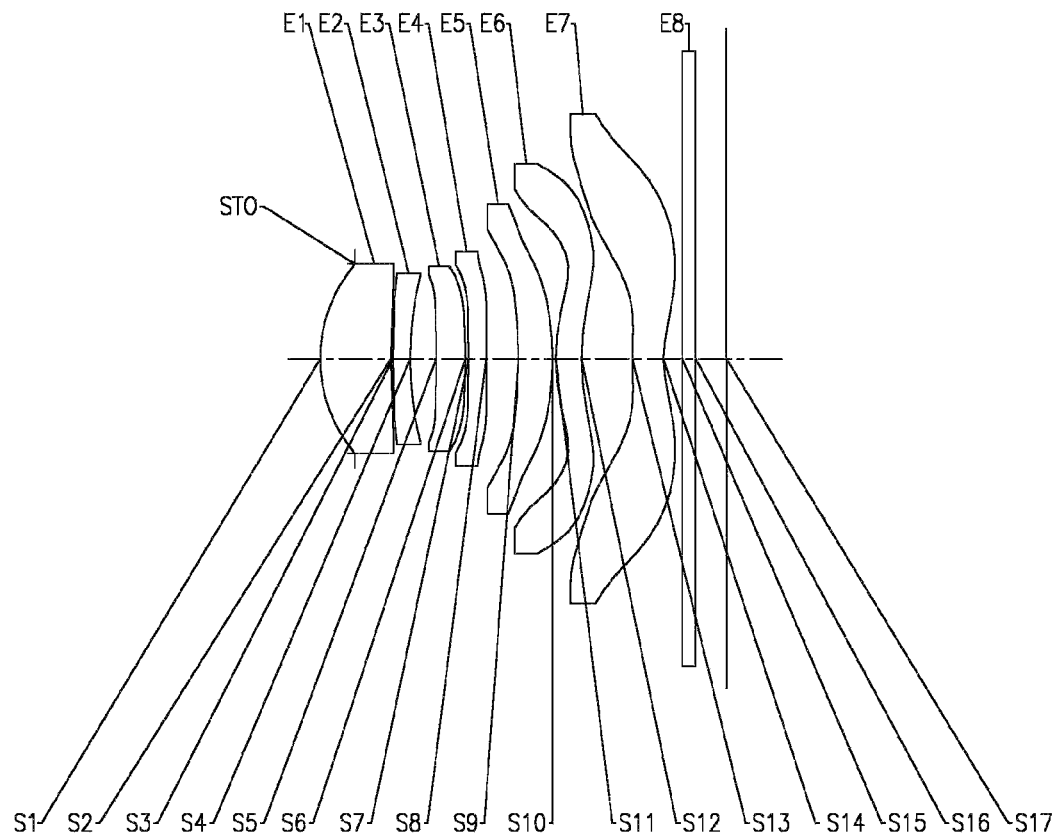
FIG. 1 is a schematic structural diagram of an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object-side surface of the lens, and a surface of the each lens that is closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of" when preceding a list of listed features, modify the entire list of features rather than an individual element in the list. Further, the use of "may," when describing the implementations of the present disclosure, relates to "one or more implementations of the present disclosure". Also, the term "exemplary" is intended to refer to an example or illustration.

Unless otherwise defined, all terms (including technical and scientific terms) used herein have the same meaning as commonly understood by those of ordinary skill in the art to which embodiments of the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should be noted that embodiments in the present disclosure and the features in the embodiments may be combined with each other on a non-conflict basis. Embodiments of the present disclosure will be described below in detail with reference to the accompanying drawings.

Features, principles and other aspects of the present disclosure are described below in detail.

An optical imaging lens assembly according to exemplary implementations of the present disclosure may include seven lenses having refractive powers, which are respectively a first lens, a second lens, a third lens, a fourth lens, a fifth lens, a sixth lens and a seventh lens. The seven lenses are arranged in sequence along the optical axis from an object side to an image side. Any two adjacent lenses in the first to seventh lenses may have a spacing distance.

In an exemplary implementation, the first lens may have a positive refractive power. The second lens may have a negative refractive power. The third lens may have a positive refractive power. The fourth lens may have a negative refractive power. The fifth lens may have a positive refractive power. The sixth lens may have a positive refractive power. The seventh lens may have a negative refractive power.

In an exemplary implementation, the optical imaging lens assembly may satisfy: f×tan(Semi-FOV)≥5.0 mm. Here, f is a total effective focal length of the optical imaging lens assembly, and Semi-FOV is half of a maximal field-of-view of the optical imaging lens assembly. Satisfying f×tan(Semi-FOV)≥5.0 mm is conducive to making the optical imaging lens assembly have better imaging quality, ensure that the lens assembly has a larger imaging plane on the basis of achieving miniaturization.

In an exemplary implementation, the optical imaging lens assembly may satisfy: 1.5<CT1/ET1<2.0. Here, CT1 is a center thickness of the first lens on the optical axis, and ET1 is an edge thickness of the first lens. Satisfying 1.5<CT1/ET1<2.0 is conducive to avoiding the generation of stray light induced by total internal reflection inside the first lens, and is conducive to making the image quality on the imaging plane clearer when the light is incident at a large angle. In embodiments of the present disclosure, edge thickness of a lens refers to lens thickness at the vertex of maximal effective radius (i.e., radius of clear aperture) of the lens.

In an exemplary implementation, the optical imaging lens assembly may satisfy: 2.3≤EPD/CT1<3.0. Here, EPD is an entrance pupil diameter of the optical imaging lens assembly, and CT1 is a center thickness of the first lens on the optical axis. Satisfying 2.3≤EPD/CT1<3.0 is conducive to increasing the entrance pupil diameter of the optical imaging lens assembly, avoiding the generation of stray light induced by total internal reflection inside the first lens, and ensuring the processability of the first lens.

In an exemplary implementation, the optical imaging lens assembly may satisfy: $-1.5<f7/(R13-R14)<-0.5$. Here, f7 is an effective focal length of the seventh lens, R13 is a radius of curvature of the object-side surface of the seventh lens, and R14 is a radius of curvature of the image-side surface of the seventh lens. More particularly, f7, R13 and R14 may further satisfy: $-1.2<f7/(R13-R14)<-0.8$. Satisfying $-1.5<f7/(R13-R14)<-0.5$ is conducive to ensuring that the lens assembly still has good imaging quality when shooting close-up shots. If $f7/(R13-R14)<-1.5$, or $f7/(R13-R14)>-0.5$, the imaging quality of the lens assembly may deteriorate when shooting close-up shots.

In an exemplary implementation, the optical imaging lens assembly may satisfy: $1.5 \leq f6/R11-f6/R12<2.0$. Here, f6 is an effective focal length of the sixth lens, R11 is a radius of curvature of the object-side surface of the sixth lens, and R12 is a radius of curvature of the image-side surface of the sixth lens. More particularly, f6, R11 and R12 may further satisfy: $1.5 \leq f6/R11-f6/R12<1.8$. Satisfying $1.5 \leq f6/R11-f6/R12<2.0$ is conducive to the smooth transition of light at the edge of the field of view, so that the lens assembly has good imaging quality when shooting close-up shots. If $f6/R11-f6/R12<1.5$, or $f6/R11-f46/R12>2.0$, the imaging quality of the lens assembly may deteriorate when shooting close-up shots.

In an exemplary implementation, the optical imaging lens assembly may satisfy: $1.0<f12/f1<1.5$. Here, f1 is an effective focal length of the first lens, f12 is a combined focal length of the first lens and the second lens. Satisfying $1.0<f12/f1<1.5$ is conducive to making the first lens and the second lens more like to a cemented lens, thus is conducive to correcting chromatic aberration and improving the imaging quality. By reasonably distributing the focal lengths of the first lens and the second lens, it is conducive to reducing tolerance sensitivity.

In an exemplary implementation, the optical imaging lens assembly may satisfy: $-2.0<f2/f3 \leq -1.5$. Here, f2 is an effective focal length of the second lens, f3 is an effective focal length of the third lens. Satisfying $-2.0<f2/f3 \leq -1.5$ is conducive to reducing tolerance sensitivity of the whole lens assembly, and to avoiding tolerance sensitive points being concentrated on a certain lens.

In an exemplary implementation, the optical imaging lens assembly may satisfy: $|f/f5-f/f6|<0.3$. Here, f is a total effective focal length of the optical imaging lens assembly, f5 is an effective focal length of the fifth lens, and f6 is an effective focal length of the sixth lens. Satisfying $|f/f5-f/f6|<0.3$ is conducive to controlling the lateral chromatic aberration of the edge field of view, and at the same time is conducive to controlling the image quality when shooting close-up shots.

In an exemplary implementation, the optical imaging lens assembly may satisfy: $-3.0<f56/f7 \leq -1.4$. Here, f56 is a combined focal length of the fifth lens and the sixth lens, and f7 is an effective focal length of the seventh lens. More particularly, f56 and f7 may further satisfy: $-2.8<f56/f7 \leq -1.4$. Satisfying $-3.0<f56/f7 \leq -1.4$ is conducive to controlling the lateral chromatic aberration of the edge field of view, and at the same time is conducive to controlling the image quality when shooting close-up shots, and is also conducive to making full use of the lens assembly installation space and improving the assembly stability of lens assembly.

In an exemplary implementation, the optical imaging lens assembly may satisfy: $-1.0 \leq (T56+CT6)/SAG62<-0.5$. Here, CT6 is a center thickness of the sixth lens on the optical axis, T56 is a spacing distance between the fifth lens and the sixth lens on the optical axis, and SAG62 is a distance on the optical axis from an intersection point of an image-side surface of the sixth lens and the optical axis to a vertex of a maximal effective radius of the image-side surface of the sixth lens. More particularly, T56, CT6 and SAG62 may further satisfy: $-1.0 \leq (T56+CT6)/SAG62<-0.6$. Satisfying $-1.0 \leq (T56+CT6)/SAG62<-0.5$ is conducive to improving the image quality at the center field of view area. At the same time, by reasonably setting the shape of the sixth lens, the light can be smoothly transitioned, which is conducive to reducing drastic changes of the aberration caused by the change of the object distance.

In an exemplary implementation, the optical imaging lens assembly may satisfy: $-1.5<CT5/(SAG61+T56) \leq -0.8$. Here, CT5 is a center thickness of the fifth lens on the optical axis, T56 is a spacing distance between the fifth lens and the sixth lens on the optical axis, and SAG61 is a distance on the optical axis from an intersection point of an object-side surface of the sixth lens and the optical axis to a vertex of a maximal effective radius of the object-side surface of the sixth lens. More particularly, CT5, SAG61 and T56 may further satisfy: $-1.4<CT5/(SAG61+T56) \leq -0.8$. Satisfying $-1.5<CT5/(SAG61+T56) \leq -0.8$ is conducive to the assembly and abutment between the fifth lens and the sixth lens, to ensuring assembly stability.

In an exemplary implementation, the optical imaging lens assembly may satisfy: $-1.6<SAG71/T67 \leq -1.2$. Here, SAG71 is a distance on the optical axis from an intersection point of an object-side surface of the seventh lens and the optical axis to a vertex of a maximal effective radius of the object-side surface of the seventh lens, and T67 is a spacing distance between the sixth lens and the seventh lens on the optical axis. Satisfying $-1.6<SAG71/T67 \leq -1.2$ is conducive to controlling the processability of the seventh lens in a lens assembly having a large image plane, and avoiding poor processing or molding.

In an exemplary implementation, the optical imaging lens assembly may satisfy: $1.6<CT3/CT4<2.0$. Here, CT3 is a center thickness of the third lens on the optical axis, and CT4 is a center thickness of the fourth lens on the optical axis. Satisfying $1.6<CT3/CT4<2.0$ is conducive to making the third lens and the fourth lens being structured more like to a cemented lens. By reasonably distributing the thicknesses of the third lens and the fourth lens, it is conducive to achieving the best aberration correction and improving the quality of the lens assembly.

In an exemplary implementation, the optical imaging lens assembly may satisfy: $0.8<(T23+T45+T67)/\Sigma AT<1.0$. Here, T23 is a spacing distance between the second lens and the third lens on the optical axis, T45 is a spacing distance between the fourth lens and the fifth lens on the optical axis, T67 is a spacing distance between the sixth lens and the seventh lens on the optical axis, and $\Sigma AT$ is a sum of spacing distances between any two adjacent lenses in the first to seventh lenses on the optical axis. By satisfying $0.8<(T23+T45+T67)/\Sigma AT<1.0$, the limited space in the lens assembly can be made full used of, and on the basis of ensuring excellent imaging quality, the lens assembly can obtain good characteristics for molding, processing, assembly and the like of the lens.

In an exemplary implementation, the optical imaging lens assembly may satisfy: $-11.0<f5/R9+f5/R10<-4.5$. Here, f5 is an effective focal length of the fifth lens, R9 is a radius of curvature of the object-side surface of the fifth lens, and R10 is a radius of curvature of the image-side surface of the fifth lens. More particularly, f5, R9 and R10 may further satisfy: $-10.6<f5/R9+f5/R10<-4.7$. Satisfying $-11.0<f5/R9+f5/R10<-4.5$ is conducive to the convergence of the lateral chromatic aberration at the edge field of view of the imaging lens assembly, and at the same time conducive to controlling the step difference between the other lenses and the fifth lens, ensuring the stability of assembly.

In an exemplary implementation, the optical imaging lens assembly according to the present disclosure may satisfy: ImgH/TTL>0.6. Here, TTL is a distance from the object-side surface of first lens to the image plane of the optical imaging lens assembly on the optical axis, and ImgH is half of a diagonal length of an effective pixel area on the image plane of the optical imaging lens assembly. Satisfying ImgH/TTL>0.6 is conducive to achieving miniaturization of the lens assembly, and achieving good imaging quality and higher relative illuminance.

In an exemplary implementation, the optical imaging lens assembly may further include a stop disposed between the object side and the first lens. Alternatively, the above optical imaging lens assembly may further include an optical filter for correcting color deviations and/or a protective glass for protecting a photosensitive element on the image plane. Implementations of the present disclosure provide an optical imaging lens assembly having characteristics such as high pixels, high illumination, small distortion, large image plane and high imaging quality. The optical imaging lens assembly according to above implementations of the present disclosure may use a plurality of lenses, for example, the above seven lenses. By reasonably distributing the refractive powers and the surface types of the lenses, the center thicknesses of the lenses, the axial spacings between the lenses, etc., it is possible to effectively converge the incident light, reduce the total track length of the imaging lens assembly and improve the processability of the imaging lens assembly, which is more conducive to the production and processing of the optical imaging lens assembly.

In implementations of the present disclosure, at least one of the surfaces of the lenses is an aspheric surface. That is, at least one of the surfaces from the object-side surface of the first lens to the image-side surface of the seventh lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, the sixth lens and the seventh lens is an aspheric surface. Alternatively, the object-side surface and the image-side surface of each of the first lens, the second lens, the third lens, the fourth lens, the fifth lens, the sixth lens and the seventh lens are aspheric surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having seven lenses is described as an example in the implementations, the optical imaging lens assembly is not limited to having the seven lenses. If desired, the optical imaging lens assembly may also include other numbers of lenses.

Embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1 to 2D. FIG. 1 is a schematic structural diagram of the optical imaging lens assembly according to Embodiment 1 of the present disclosure.

As shown in FIG. 1, the optical imaging lens assembly includes, sequentially from an object side to an image side, a stop STO, a first lens E1, a second lens E2, a third lens E3, a fourth lens E4, a fifth lens E5, a sixth lens E6, a seventh lens E7, an optical filter E8 and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the surfaces S1 to S16 and finally forms an image on the image plane S17.

Table 1 is a table showing basic parameters of the optical imaging lens assembly in Embodiment 1. Here, the units of a radius of curvature, a thickness/distance and a focal length are millimeters (mm).

TABLE 1

| surface number | surface type | radius of curvature | Thickness/ distance | material refractive index | abbe number | focal length | conic coefficient |
|---|---|---|---|---|---|---|---|
| OBJ | spherical | infinite | infinite | | | | |
| STO | spherical | infinite | −0.6700 | | | | |
| S1 | aspheric | 2.9002 | 1.3790 | 1.546 | 55.97 | 6.53 | 0.0765 |
| S2 | aspheric | 27.2511 | 0.0368 | | | | 0.0000 |
| S3 | aspheric | 11.4083 | 0.3402 | 1.687 | 18.14 | −24.31 | 28.1046 |
| S4 | aspheric | 6.6959 | 0.5018 | | | | 6.5577 |

TABLE 1-continued

| surface number | surface type | radius of curvature | Thickness/ distance | material refractive index | abbe number | focal length | conic coefficient |
|---|---|---|---|---|---|---|---|
| S5 | aspheric | 297.1319 | 0.5734 | 1.546 | 55.97 | 15.73 | 21.9014 |
| S6 | aspheric | −8.8361 | 0.0617 | | | | 4.6483 |
| S7 | aspheric | −51.6171 | 0.3400 | 1.678 | 19.24 | −21.84 | 19.7929 |
| S8 | aspheric | 20.7985 | 0.6304 | | | | −39.1004 |
| S9 | aspheric | −7.7335 | 0.6686 | 1.546 | 55.97 | 19.00 | 3.0913 |
| S10 | aspheric | −4.5651 | 0.0584 | | | | −0.3642 |
| S11 | aspheric | 4.1892 | 0.5077 | 1.546 | 55.97 | 34.33 | 0.3572 |
| S12 | aspheric | 5.1646 | 0.9902 | | | | −0.5839 |
| S13 | aspheric | 7.1660 | 0.6022 | 1.546 | 55.97 | −5.53 | 1.0515 |
| S14 | aspheric | 2.0610 | 0.3694 | | | | −6.1020 |
| S15 | spherical | infinite | 0.2600 | 1.518 | 64.17 | | |
| S16 | spherical | infinite | 0.6000 | | | | |
| S17 | spherical | infinite | | | | | |

In this embodiment, a total effective focal length f of the optical imaging lens assembly is 6.61 mm, and a maximal field-of-view FOV of the optical imaging lens assembly is 81.8°.

In Embodiment 1, both the object-side surface and the image-side surface of any lens in the first to seventh lenses E1 to E7 are aspheric surfaces, and the surface type x of an aspheric lens may be defined using, but not limited to, the following formula:

$$x = \frac{ch^2}{1+\sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and $A_i$ is the correction coefficient of an i-th order of the aspheric surface. Table 2 below show the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1 to S14 in Embodiment 1.

TABLE 2

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | −2.5695E−03 | −5.1364E−03 | −4.3682E−04 | −8.1534E−04 | 9.1000E−06 | −3.7299E−04 | 1.6691E−04 | 0.0000E+00 | 0.0000E+00 |
| S2 | 4.2841E−02 | −2.6117E−03 | 8.6613E−03 | −1.7005E−03 | 3.9465E−04 | 2.1448E−04 | −8.8481E−04 | 0.0000E+00 | 0.0000E+00 |
| S3 | −8.1911E−02 | 1.6487E−02 | −1.6689E−03 | 4.2607E−05 | −1.5998E−04 | −1.4929E−04 | 1.0202E−04 | 5.8396E−06 | −5.3672E−06 |
| S4 | −3.1028E−02 | 4.8496E−03 | 2.6002E−04 | −9.7970E−05 | −2.1063E−05 | −2.1002E−04 | 1.1045E−04 | −6.9625E−05 | 3.0586E−05 |
| S5 | −1.2483E−01 | −1.7214E−02 | 7.7262E−05 | −4.6090E−05 | −3.5303E−04 | −1.4005E−05 | −1.3599E−04 | 7.3026E−05 | 2.1192E−05 |
| S6 | −7.3666E−02 | −5.1181E−02 | 1.3973E−02 | −3.9550E−03 | 5.2652E−04 | 2.3271E−04 | −4.7358E−04 | 2.5428E−04 | 5.6337E−07 |
| S7 | −2.0095E−01 | −2.9277E−02 | 9.3553E−03 | −4.7079E−03 | 4.3880E−04 | 4.8330E−04 | −7.0803E−04 | 8.3255E−05 | 1.1146E−04 |
| S8 | −3.1867E−01 | 3.5347E−02 | 1.5912E−02 | 3.5564E−03 | 1.4892E−03 | −3.7125E−04 | −7.5600E−04 | −3.2362E−04 | −2.3076E−06 |
| S9 | −1.2810E−01 | −4.5802E−02 | 5.6200E−02 | −7.3845E−03 | −4.4238E−03 | −1.7083E−03 | 2.2321E−04 | 1.3198E−04 | 3.5051E−04 |
| S10 | 1.8582E−01 | 4.8047E−02 | 2.6374E−02 | −5.3450E−02 | 1.2898E−02 | 5.0682E−03 | −1.0869E−03 | −2.6445E−03 | 1.3951E−03 |
| S11 | −2.8185E+00 | 2.8970E−02 | 1.6353E−01 | −3.0152E−02 | 5.2239E−06 | −6.3843E−03 | −4.4993E−03 | −1.4639E−04 | 2.0201E−03 |
| S12 | −2.3585E+00 | 1.2321E−02 | −2.5364E−02 | −4.9310E−02 | 3.9698E−02 | 1.2860E−02 | −4.2429E−03 | 1.5064E−03 | −1.4979E−03 |
| S13 | −4.0713E+00 | 1.3115E+00 | −6.0440E−01 | 2.6931E−01 | −9.2918E−02 | 1.3288E−02 | −1.1293E−02 | 1.1806E−02 | −5.4992E−03 |
| S14 | −3.8238E+00 | 8.2265E−01 | −1.7610E−01 | 1.3964E−01 | −5.9849E−02 | 2.4241E−02 | −1.2527E−02 | 5.2281E−03 | −6.3895E−03 |

Figures 2A, 2B:
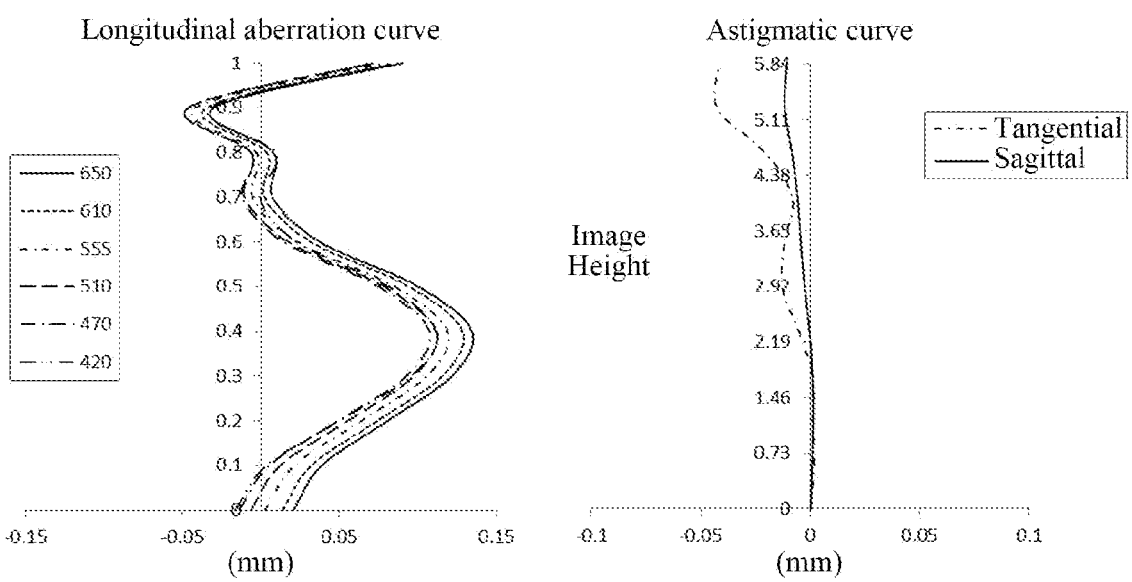
FIGS. 2A to 2D respectively show a longitudinal aberration curve, an astigmatic curve, a distortion curve and a lateral color curve of the optical imaging lens assembly according to Embodiment 1.
Figure 2C:
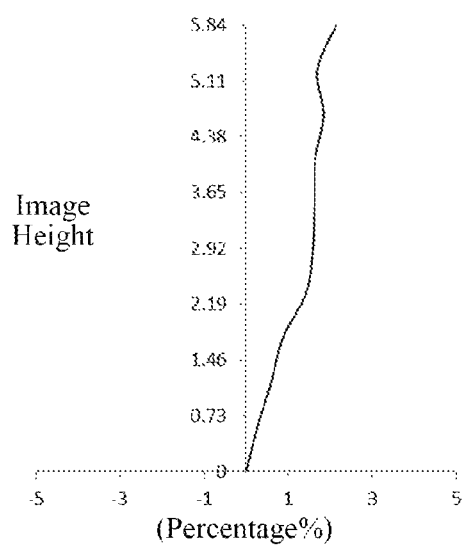
Figure 2D:
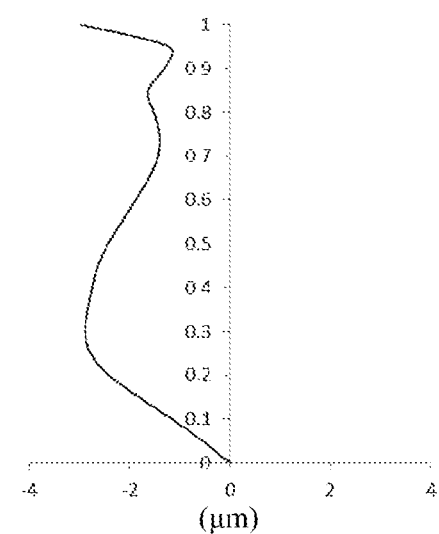

FIG. 2A illustrates a longitudinal aberration curve of the optical imaging lens assembly according to Embodiment 1, representing deviations of focal points of light of different wavelengths converged after passing through the lens assembly. FIG. 2B illustrates an astigmatic curve of the optical imaging lens assembly according to Embodiment 1, representing a curvature of a tangential image plane and a curvature of a sagittal image plane. FIG. 2C illustrates a distortion curve of the optical imaging lens assembly according to Embodiment 1, representing amounts of distortion corresponding to different image heights. FIG. 2D illustrates a lateral color curve of the optical imaging lens assembly according to Embodiment 1, representing deviations of different image heights on the image plane after light passes through the lens assembly. It can be seen from FIGS. 2A to 2D that the optical imaging lens assembly given in Embodiment 1 can achieve a good imaging quality.

Embodiment 2

Figure 3:
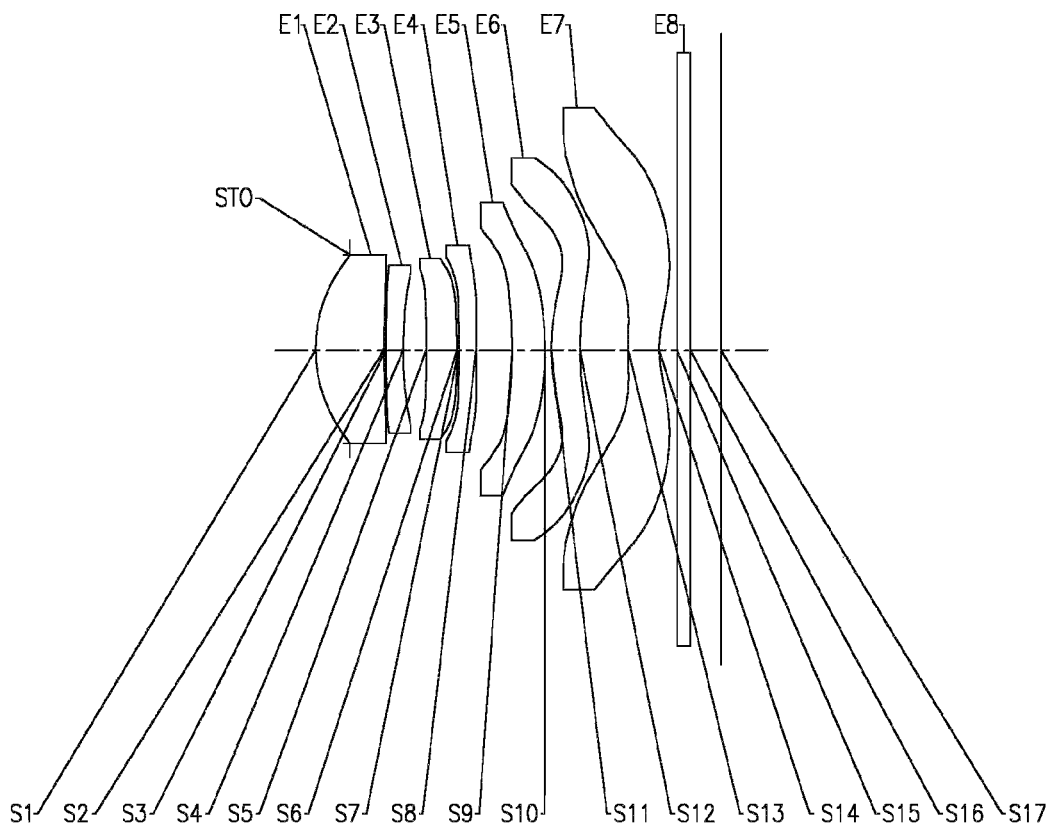
FIG. 3 is a schematic structural diagram of an optical imaging lens assembly according to Embodiment 2 of the present disclosure.

An optical imaging lens assembly according to Embodiment 2 of the present disclosure is described below with reference to FIGS. 3 to 4D. In this embodiment and the following embodiments, for the sake of brevity, some descriptions similar to those in Embodiment 1 will be omitted. FIG. 3 is a schematic structural diagram of the optical imaging lens assembly according to Embodiment 2 of the present disclosure.

As shown in FIG. 3, the optical imaging lens assembly includes, sequentially from an object side to an image side, a stop STO, a first lens E1, a second lens E2, a third lens E3, a fourth lens E4, a fifth lens E5, a sixth lens E6, a seventh lens E7, an optical filter E8 and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the surfaces S1 to S16 and finally forms an image on the image plane S17.

In this embodiment, a total effective focal length f of the optical imaging lens assembly is 6.60 mm, and a maximal field-of-view FOV of the optical imaging lens assembly is 80.5°.

Table 3 is a table showing basic parameters of the optical imaging lens assembly in Embodiment 2. Here, the units of a radius of curvature, a thickness/distance and a focal length are millimeters (mm). Table 4 show the high-order coefficients applicable to the aspheric surfaces in Embodiment 2. Here, the surface type of each aspheric surface may be defined using the formula (1) given in Embodiment 1.

TABLE 3

| surface number | surface type | radius of curvature | Thickness/ distance | material refractive index | abbe number | focal length | conic coefficient |
|---|---|---|---|---|---|---|---|
| OBJ | spherical | infinite | infinite | | | | |
| STO | spherical | infinite | −0.6700 | | | | |
| S1 | aspheric | 2.8193 | 1.3338 | 1.546 | 55.97 | 6.74 | 0.0088 |
| S2 | aspheric | 28.3772 | 0.0373 | | | | 0.0000 |
| S3 | aspheric | 14.0494 | 0.3400 | 1.687 | 18.14 | −29.44 | 34.5443 |
| S4 | aspheric | 8.2089 | 0.4515 | | | | 10.1786 |
| S5 | aspheric | −206.5099 | 0.6064 | 1.546 | 55.97 | 18.24 | 99.0000 |
| S6 | aspheric | −9.5092 | 0.0285 | | | | 14.9279 |
| S7 | aspheric | −85.0053 | 0.3400 | 1.678 | 19.24 | −31.12 | 99.0000 |
| S8 | aspheric | 28.0876 | 0.7026 | | | | 64.2791 |
| S9 | aspheric | −7.4411 | 0.6449 | 1.546 | 55.97 | 27.74 | 5.0636 |
| S10 | aspheric | −5.1417 | 0.1163 | | | | 0.1845 |
| S11 | aspheric | 4.4288 | 0.5632 | 1.546 | 55.97 | 23.06 | 0.3572 |
| S12 | aspheric | 6.5266 | 0.9443 | | | | −0.7187 |
| S13 | aspheric | 7.5009 | 0.6000 | 1.537 | 55.62 | −5.40 | 1.1850 |
| S14 | aspheric | 2.0343 | 0.3521 | | | | −7.6455 |
| S15 | spherical | infinite | 0.2600 | 1.518 | 64.17 | | |
| S16 | spherical | infinite | 0.6000 | | | | |
| S17 | spherical | infinite | | | | | |

TABLE 4

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | −1.2004E−02 | −3.9087E−03 | −1.5408E−03 | −3.8684E−04 | −1.1605E−04 | −7.7752E−06 | 4.4908E−06 | 0.0000E+00 | 0.0000E+00 |
| S2 | 3.5168E−02 | 6.5570E−03 | 1.0780E−02 | −3.6503E−03 | 2.3455E−03 | −1.3280E−03 | 2.2460E−04 | 0.0000E+00 | 0.0000E+00 |
| S3 | −6.9647E−02 | 1.8717E−02 | −9.0010E−04 | 1.3149E−04 | 6.1360E−05 | −1.1598E−04 | −2.5246E−05 | 3.3450E−06 | 1.4750E−06 |
| S4 | −9.1682E−03 | 3.1478E−03 | 1.9710E−04 | 3.1982E−04 | 8.1961E−05 | 1.0190E−05 | 4.5363E−06 | −4.0153E−07 | 2.4842E−07 |
| S5 | −1.0549E−01 | −1.8393E−02 | 3.5211E−06 | 8.5153E−04 | 3.2593E−04 | 1.0295E−04 | 4.8892E−05 | 2.0427E−05 | 1.1290E−05 |
| S6 | −9.5005E−02 | −5.5702E−02 | 1.4178E−02 | −2.8409E−03 | 1.5941E−03 | −1.3237E−03 | 6.5116E−04 | 1.0630E−05 | 1.0451E−04 |
| S7 | −2.0569E−01 | −2.8934E−02 | 1.2583E−02 | −4.7867E−03 | 1.0120E−03 | −1.5045E−03 | 4.9175E−04 | −1.1496E−05 | 4.0931E−05 |
| S8 | −2.6428E−01 | 2.5855E−02 | 1.4841E−02 | 1.4898E−03 | 1.7858E−03 | −5.9953E−05 | 1.0420E−04 | −3.2644E−05 | −6.2402E−05 |
| S9 | −7.5995E−02 | −9.4514E−02 | 2.9403E−02 | 2.6628E−03 | 2.2647E−03 | 2.3455E−04 | −8.1879E−05 | −9.5988E−05 | −9.1094E−05 |
| S10 | 2.8514E−03 | 3.4263E−02 | 5.1515E−02 | −3.5182E−02 | 1.6907E−03 | 1.0238E−03 | 2.1534E−03 | −7.4259E−04 | −4.7496E−05 |
| S11 | −2.4829E+00 | 3.7907E−02 | 1.5392E−01 | −2.8207E−02 | 2.5371E−03 | 3.2051E−04 | −9.8381E−04 | −1.8845E−03 | 8.4742E−04 |
| S12 | −2.0666E+00 | 2.7170E−02 | 2.7097E−02 | −5.8951E−02 | 2.1761E−02 | 1.2095E−02 | −9.5226E−04 | 2.1319E−03 | −6.9143E−06 |
| S13 | −3.8074E+00 | 1.3280E+00 | −5.7106E−01 | 2.2756E−01 | −7.5120E−02 | 2.1961E−02 | −1.1518E−02 | 5.5748E−03 | −1.3360E−03 |
| S14 | −3.5120E+00 | 7.4343E−01 | −2.0887E−01 | 1.4834E−01 | −4.7152E−02 | 9.9825E−03 | −1.2017E−02 | 2.7570E−03 | −2.7401E−03 |

Figure 4A:
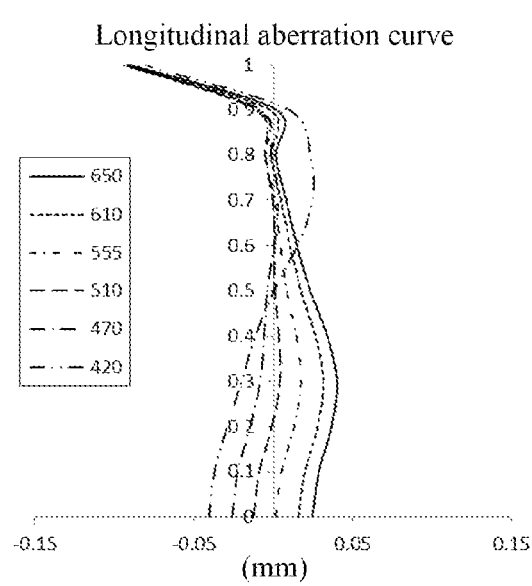
FIGS. 4A to 4D respectively show a longitudinal aberration curve, an astigmatic curve, a distortion curve and a lateral color curve of the optical imaging lens assembly according to Embodiment 2.
Figure 4B:
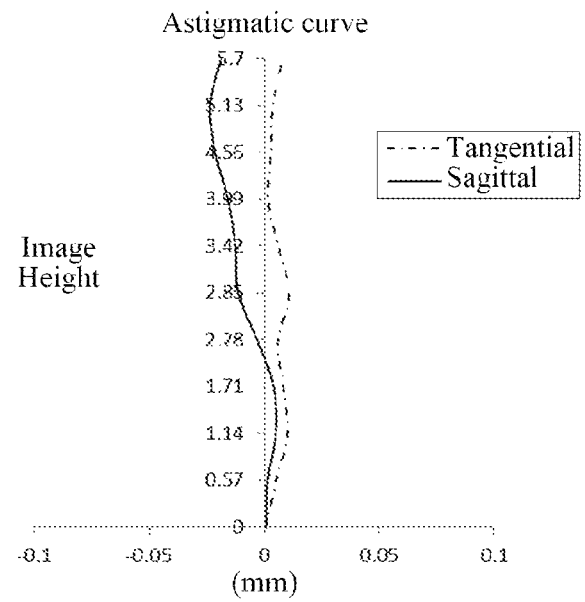
Figure 4C:
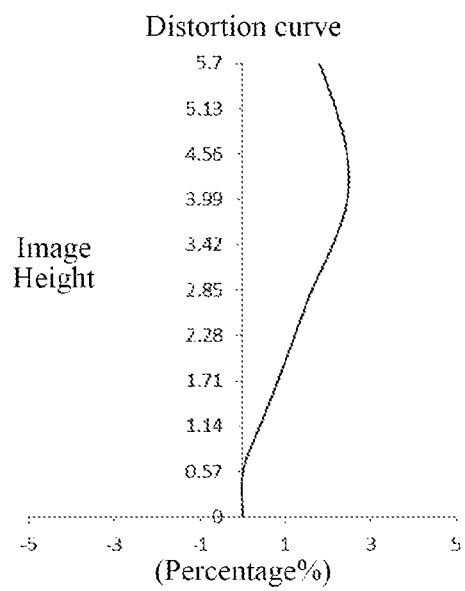
Figure 4D:
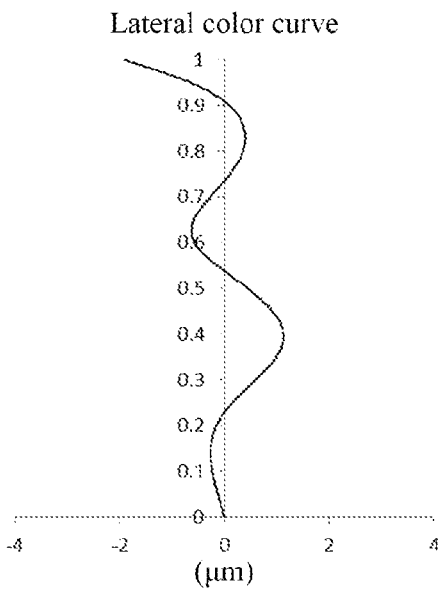

FIG. 4A illustrates a longitudinal aberration curve of the optical imaging lens assembly according to Embodiment 2, representing deviations of focal points of light of different wavelengths converged after passing through the lens assembly. FIG. 4B illustrates an astigmatic curve of the optical imaging lens assembly according to Embodiment 2, representing a curvature of a tangential image plane and a curvature of a sagittal image plane. FIG. 4C illustrates a distortion curve of the optical imaging lens assembly according to Embodiment 2, representing amounts of distortion corresponding to different image heights. FIG. 4D illustrates a lateral color curve of the optical imaging lens assembly according to Embodiment 2, representing deviations of different image heights on the image plane after light passes through the lens assembly. It can be seen from FIGS. 4A to 4D that the optical imaging lens assembly given in Embodiment 2 can achieve a good imaging quality.

Embodiment 3

Figure 5:
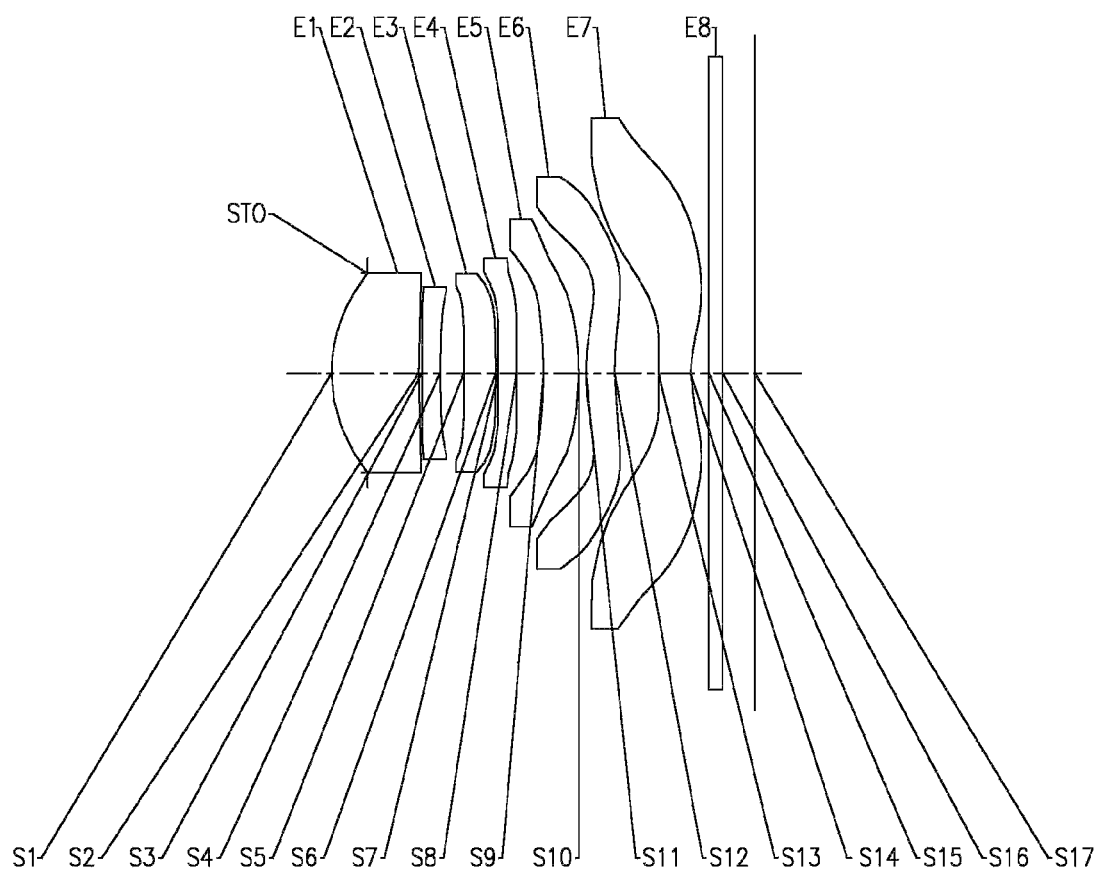
FIG. 5 is a schematic structural diagram of an optical imaging lens assembly according to Embodiment 3 of the present disclosure.

An optical imaging lens assembly according to Embodiment 3 of the present disclosure is described below with reference to FIGS. 5 to 6D. FIG. 5 is a schematic structural diagram of the optical imaging lens assembly according to Embodiment 3 of the present disclosure.

As shown in FIG. 5, the optical imaging lens assembly includes, sequentially from an object side to an image side, a stop STO, a first lens E1, a second lens E2, a third lens E3, a fourth lens E4, a fifth lens E5, a sixth lens E6, a seventh lens E7, an optical filter E8 and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the surfaces S1 to S16 and finally forms an image on the image plane S17.

In this example, a total effective focal length f of the optical imaging lens assembly is 6.68 mm, and a maximal field-of-view FOV of the optical imaging lens assembly is 80.5°.

Table 5 is a table showing basic parameters of the optical imaging lens assembly in Embodiment 3. Here, the units of a radius of curvature, a thickness/distance and a focal length are millimeters (mm). Table 6 show the high-order coefficients applicable to the aspheric surfaces in Embodiment 3. Here, the surface type of each aspheric surface may be defined using the formula (1) given in Embodiment 1.

TABLE 5

| surface number | surface type | radius of curvature | Thickness/ distance | material refractive index | abbe number | focal length | conic coefficient |
|---|---|---|---|---|---|---|---|
| OBJ | spherical | infinite | infinite | | | | |
| STO | spherical | infinite | −0.6700 | | | | |
| S1 | aspheric | 2.8412 | 1.6329 | 1.546 | 55.97 | 6.79 | −0.0344 |
| S2 | aspheric | 34.0644 | 0.0596 | | | | 0.0000 |
| S3 | aspheric | 28.4062 | 0.3400 | 1.687 | 18.14 | −54.90 | 99.0000 |
| S4 | aspheric | 16.1242 | 0.4436 | | | | 30.8920 |
| S5 | aspheric | 157.5398 | 0.5980 | 1.546 | 55.97 | 29.43 | −99.0000 |

TABLE 5-continued

| surface number | surface type | radius of curvature | Thickness/ distance | material refractive index | abbe number | focal length | conic coefficient |
|---|---|---|---|---|---|---|---|
| S6 | aspheric | −17.8613 | 0.0446 | | | | 43.0828 |
| S7 | aspheric | −235.3495 | 0.3400 | 1.678 | 19.24 | −55.95 | 99.0000 |
| S8 | aspheric | 45.2092 | 0.5106 | | | | 53.6677 |
| S9 | aspheric | −6.6137 | 0.6583 | 1.546 | 55.97 | 29.41 | 4.1842 |
| S10 | aspheric | −4.8484 | 0.1330 | | | | 0.0004 |
| S11 | aspheric | 4.5272 | 0.5376 | 1.546 | 55.97 | 24.45 | 0.3572 |
| S12 | aspheric | 6.5636 | 0.8210 | | | | −1.2448 |
| S13 | aspheric | 7.5073 | 0.6000 | 1.537 | 55.62 | −4.84 | 1.2993 |
| S14 | aspheric | 1.8778 | 0.3418 | | | | −7.0691 |
| S15 | spherical | infinite | 0.2600 | 1.518 | 64.17 | | |
| S16 | spherical | infinite | 0.6000 | | | | |
| S17 | spherical | infinite | | | | | |

TABLE 6

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | −1.9249E−02 | −3.4451E−03 | −1.2747E−03 | −1.7625E−04 | −9.6791E−05 | 4.0059E−05 | −1.8690E−05 | 0.0000E+00 | 0.0000E+00 |
| S2 | 3.6702E−02 | 1.2400E−02 | 8.8400E−03 | −5.0326E−03 | 2.9944E−03 | −1.1386E−03 | 2.2665E−04 | 0.0000E+00 | 0.0000E+00 |
| S3 | −4.5609E−02 | 2.3564E−02 | −1.5014E−03 | 3.8971E−04 | −1.9230E−04 | −1.1640E−04 | −3.8300E−05 | 8.5587E−07 | −9.2774E−07 |
| S4 | 1.7812E−02 | 8.0423E−03 | −9.4152E−04 | 3.1986E−04 | 3.2943E−05 | −1.7314E−05 | 1.6589E−05 | −1.1824E−06 | −3.7967E−06 |
| S5 | −1.2447E−01 | −1.7478E−02 | −1.5021E−03 | 6.5143E−05 | 2.8649E−04 | −2.0071E−05 | 1.4598E−05 | −4.0477E−05 | 9.0719E−06 |
| S6 | −1.6545E−01 | −5.7456E−02 | 1.0172E−02 | −2.0351E−03 | 4.3403E−03 | −2.1726E−03 | 2.0712E−04 | 3.7756E−05 | 7.1691E−05 |
| S7 | −2.2942E−01 | −3.0709E−02 | 1.3697E−02 | −4.1414E−03 | 3.9866E−03 | −3.0584E−03 | 1.5456E−06 | 1.6676E−04 | 6.7527E−05 |
| S8 | −2.7486E−01 | 2.1285E−02 | 2.4006E−02 | 7.7699E−04 | 2.7439E−03 | −1.8877E−03 | −1.6509E−04 | 4.7739E−05 | −9.0378E−05 |
| S9 | −7.5457E−02 | −9.1441E−02 | 4.2283E−02 | 1.9971E−03 | 3.7046E−03 | −1.9560E−04 | −7.4819E−04 | −3.8016E−04 | −7.5340E−05 |
| S10 | −7.3150E−03 | 7.6914E−02 | 2.5346E−02 | −4.3990E−02 | 5.8427E−03 | 3.3655E−03 | 4.9172E−04 | −1.2411E−03 | 3.9210E−04 |
| S11 | −2.4152E+00 | 1.3313E−01 | 1.2737E−01 | −2.7443E−02 | −5.4374E−03 | 2.6088E−03 | 2.1129E−03 | −1.8646E−03 | 3.0169E−04 |
| S12 | −2.1051E+00 | 1.7636E−01 | −2.5956E−02 | −5.1336E−02 | 1.1757E−02 | 1.0530E−02 | 9.0342E−04 | 7.0598E−04 | 1.0569E−03 |
| S13 | −3.8141E+00 | 1.3878E+00 | −6.3666E−01 | 2.6918E−01 | −9.9580E−02 | 3.3277E−02 | −1.4184E−02 | 5.3816E−03 | −1.0217E−03 |
| S14 | −3.6250E+00 | 8.0868E−01 | −2.3726E−01 | 1.7335E−01 | −6.7082E−02 | 1.7634E−02 | −1.4785E−02 | 4.9270E−03 | −7.9864E−04 |

Figure 6A:
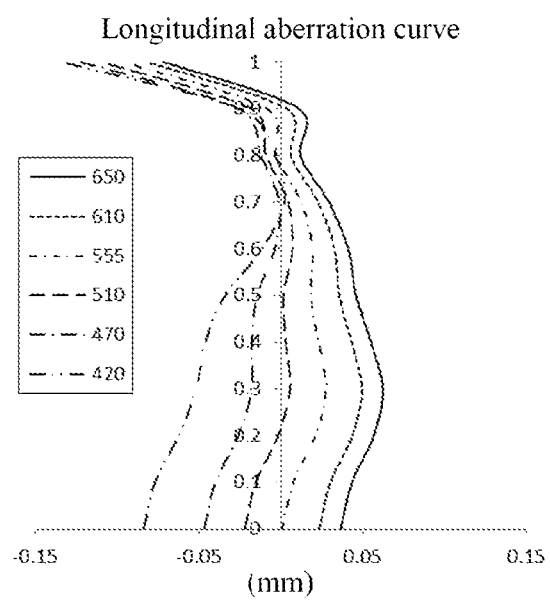
FIGS. 6A to 6D respectively show a longitudinal aberration curve, an astigmatic curve, a distortion curve and a lateral color curve of the optical imaging lens assembly according to Embodiment 3 of the present disclosure.
Figure 6B:
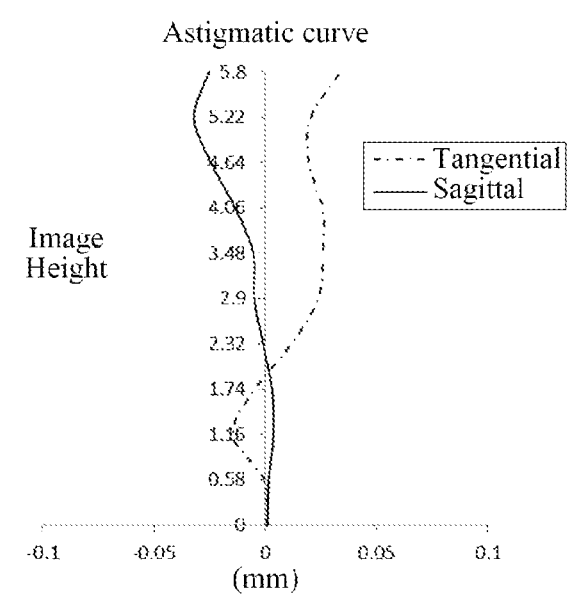
Figure 6C:
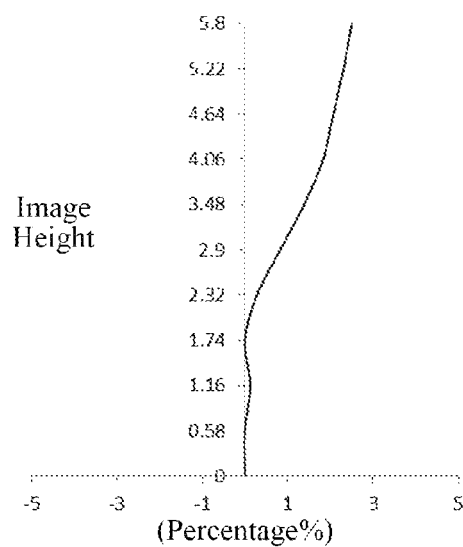
Figure 6D:
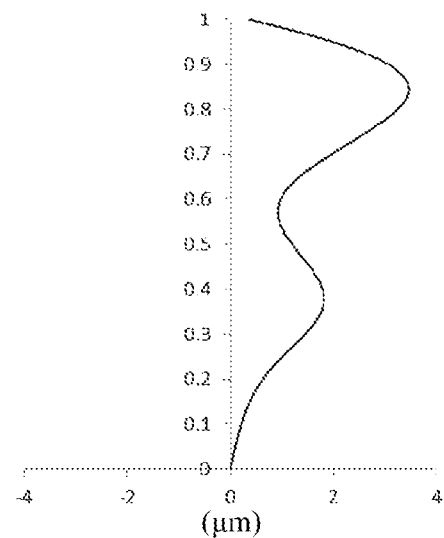

FIG. 6A illustrates a longitudinal aberration curve of the optical imaging lens assembly according to Embodiment 3, representing deviations of focal points of light of different wavelengths converged after passing through the lens assembly. FIG. 6B illustrates an astigmatic curve of the optical imaging lens assembly according to Embodiment 3, representing a curvature of a tangential image plane and a curvature of a sagittal image plane. FIG. 6C illustrates a distortion curve of the optical imaging lens assembly according to Embodiment 3, representing amounts of distortion corresponding to different image heights. FIG. 6D illustrates a lateral color curve of the optical imaging lens assembly according to Embodiment 3, representing deviations of different image heights on the image plane after light passes through the lens assembly. It can be seen from FIGS. 6A to 6D that the optical imaging lens assembly given in Embodiment 3 can achieve a good imaging quality.

Embodiment 4

Figure 7:
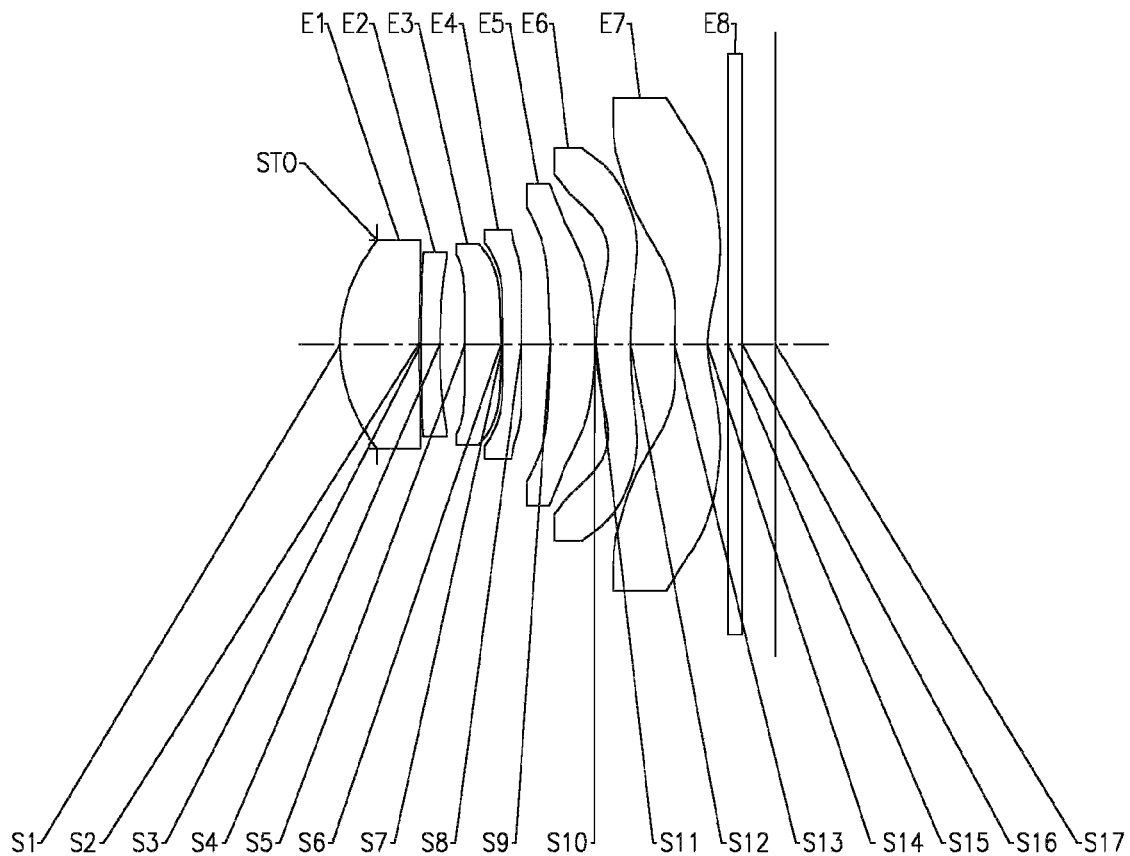
FIG. 7 is a schematic structural diagram of an optical imaging lens assembly according to Embodiment 4 of the present disclosure.

An optical imaging lens assembly according to Embodiment 4 of the present disclosure is described below with reference to FIGS. 7 to 8D. FIG. 7 is a schematic structural diagram of the optical imaging lens assembly according to Embodiment 4 of the present disclosure.

As shown in FIG. 7, the optical imaging lens assembly includes, sequentially from an object side to an image side, a stop STO, a first lens E1, a second lens E2, a third lens E3, a fourth lens E4, a fifth lens E5, a sixth lens E6, a seventh lens E7, an optical filter E8 and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the surfaces S1 to S16 and finally forms an image on the image plane S17.

In this example, a total effective focal length f of the optical imaging lens assembly is 6.11 mm, and a maximal field-of-view FOV of the optical imaging lens assembly is 80.5°.

Table 7 is a table showing basic parameters of the optical imaging lens assembly in Embodiment 4. Here, the units of a radius of curvature, a thickness/distance and a focal length are millimeters (mm). Table 8 show the high-order coefficients applicable to the aspheric surfaces in Embodiment 4. Here, the surface type of each aspheric surface may be defined using the formula (1) given in Embodiment 1.

TABLE 7

| surface number | surface type | radius of curvature | Thickness/ distance | material refractive index | abbe number | focal length | conic coefficient |
|---|---|---|---|---|---|---|---|
| OBJ | spherical | infinite | infinite | | | | |
| STO | spherical | infinite | −0.6700 | | | | |
| S1 | aspheric | 2.9562 | 1.4308 | 1.546 | 55.97 | 6.94 | 0.0065 |
| S2 | aspheric | 33.4439 | 0.0436 | | | | 0.0000 |
| S3 | aspheric | 16.4625 | 0.3400 | 1.687 | 18.14 | −34.14 | 33.4708 |
| S4 | aspheric | 9.5913 | 0.4616 | | | | 5.0703 |
| S5 | aspheric | 120.6327 | 0.6527 | 1.546 | 55.97 | 19.05 | −99.0000 |
| S6 | aspheric | −11.3582 | 0.0307 | | | | 23.4570 |
| S7 | aspheric | −176.9882 | 0.3400 | 1.678 | 19.24 | −29.75 | 99.0000 |
| S8 | aspheric | 22.7688 | 0.5269 | | | | −99.0000 |
| S9 | aspheric | −8.6915 | 0.8089 | 1.546 | 55.97 | 23.90 | −1.0648 |
| S10 | aspheric | −5.3872 | 0.0250 | | | | 0.1503 |
| S11 | aspheric | 4.1368 | 0.6240 | 1.546 | 55.97 | 14.21 | 0.3572 |
| S12 | aspheric | 8.3906 | 0.8034 | | | | 1.1113 |
| S13 | aspheric | 7.4683 | 0.6000 | 1.537 | 55.62 | −5.51 | 1.2687 |
| S14 | aspheric | 2.0599 | 0.3733 | | | | −6.1837 |
| S15 | spherical | infinite | 0.2600 | 1.518 | 64.17 | | |
| S16 | spherical | infinite | 0.6000 | | | | |
| S17 | spherical | infinite | | | | | |

TABLE 8

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | −1.3091E−02 | −2.9959E−03 | −1.0993E−03 | −2.3543E−04 | −8.8249E−05 | −2.2240E−06 | 3.6268E−06 | 0.0000E+00 | 0.0000E+00 |
| S2 | 3.6152E−02 | 1.3348E−02 | 1.6343E−03 | −2.7877E−04 | 5.5645E−04 | −1.0015E−03 | 3.4294E−04 | 0.0000E+00 | 0.0000E+00 |
| S3 | −6.7572E−02 | 1.7349E−02 | 4.5034E−04 | 1.8475E−04 | 1.8542E−04 | −1.1937E−04 | −6.3132E−05 | 5.1190E−06 | −1.7317E−06 |
| S4 | −1.3178E−02 | 2.7708E−03 | 2.1141E−04 | 1.5901E−04 | 7.8009E−05 | 1.2501E−05 | 1.7087E−06 | 1.9182E−06 | 3.0961E−07 |
| S5 | −1.2008E−01 | −1.6946E−02 | −3.5945E−04 | 2.2919E−04 | 6.5115E−06 | 2.8863E−05 | 9.4725E−06 | 1.0084E−05 | 6.2878E−06 |
| S6 | −1.2601E−01 | −5.3805E−02 | 1.3195E−02 | −3.6756E−03 | 1.7277E−03 | −1.2682E−03 | 5.6089E−04 | −5.5750E−05 | −7.8325E−06 |
| S7 | −2.3470E−01 | −3.2372E−02 | 1.3532E−02 | −3.8536E−03 | 2.1803E−03 | −1.1595E−03 | 5.0399E−04 | −3.3185E−06 | −4.5841E−05 |
| S8 | −2.9472E−01 | 1.1924E−02 | 1.7407E−02 | 1.9310E−03 | 3.2089E−03 | −2.4009E−04 | 1.3587E−04 | −1.2112E−04 | −9.5000E−05 |
| S9 | 2.9403E−02 | −9.2652E−02 | 3.1402E−02 | −6.6165E−03 | 2.2200E−03 | −4.9244E−04 | 1.5749E−05 | −9.6811E−05 | 2.9542E−05 |
| S10 | −4.3348E−02 | 4.9766E−02 | 4.3990E−02 | −3.7263E−02 | 5.8240E−03 | −4.0006E−04 | 1.3562E−03 | −6.2685E−04 | 8.8794E−05 |
| S11 | −2.5252E+00 | 3.9489E−02 | 1.6449E−01 | −3.1993E−02 | −1.9604E−03 | 1.8861E−03 | −2.2211E−03 | −1.6082E−03 | 1.0027E−03 |
| S12 | −1.9371E+00 | −3.7314E−02 | 4.5659E−03 | −3.6245E−02 | 2.6607E−02 | 8.4686E−03 | −1.0534E−02 | 3.3586E−03 | −1.0662E−03 |
| S13 | −3.5501E+00 | 1.2782E+00 | −5.8344E−01 | 2.5204E−01 | −1.0535E−01 | 1.2749E−02 | −1.4778E−03 | 4.0436E−04 | −2.7292E−03 |
| S14 | −3.2037E+00 | 7.4750E−01 | −2.1138E−01 | 1.4092E−01 | −7.1759E−02 | −6.0121E−03 | −2.3015E−02 | −4.9940E−03 | −6.0076E−03 |

Figure 8A:
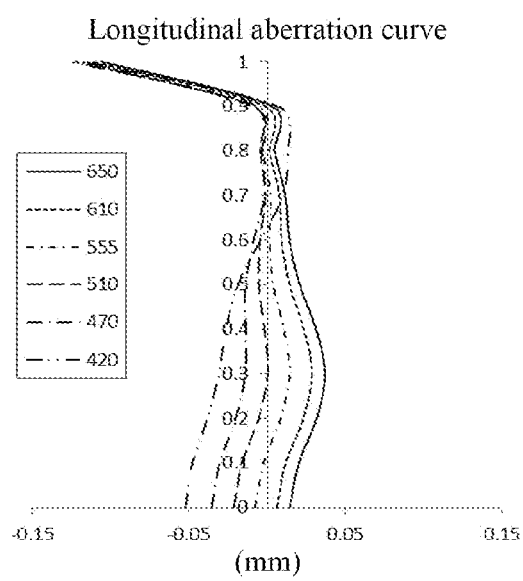
FIGS. 8A to 8D respectively show a longitudinal aberration curve, an astigmatic curve, a distortion curve and a lateral color curve of the optical imaging lens assembly according to Embodiment 4.
Figure 8B:
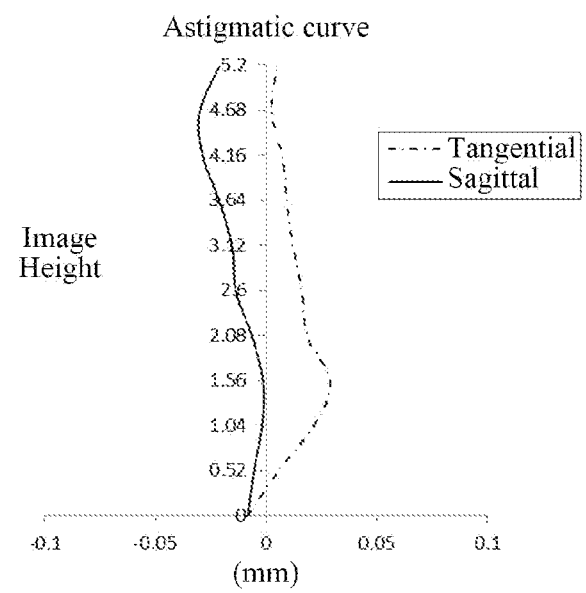
Figure 8C:
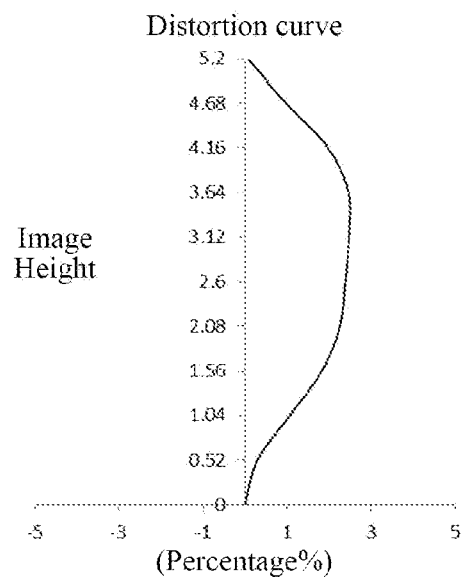
Figure 8D:
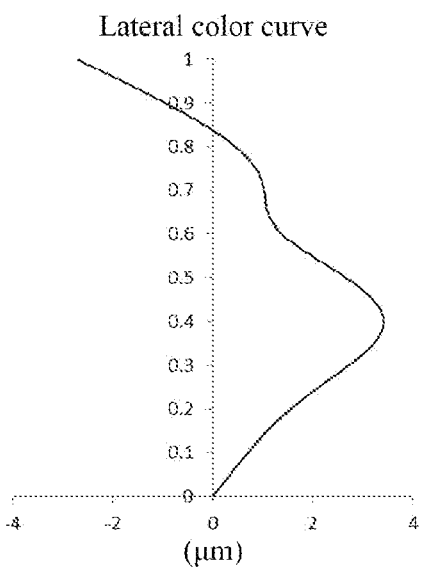

FIG. 8A illustrates a longitudinal aberration curve of the optical imaging lens assembly according to Embodiment 4, representing deviations of focal points of light of different wavelengths converged after passing through the lens assembly. FIG. 8B illustrates an astigmatic curve of the optical imaging lens assembly according to Embodiment 4, representing a curvature of a tangential image plane and a curvature of a sagittal image plane. FIG. 8C illustrates a distortion curve of the optical imaging lens assembly according to Embodiment 4, representing amounts of distortion corresponding to different image heights. FIG. 8D illustrates a lateral color curve of the optical imaging lens assembly according to Embodiment 4, representing deviations of different image heights on the image plane after light passes through the lens assembly. It can be seen from FIGS. 8A to 8D that the optical imaging lens assembly given in Embodiment 4 can achieve a good imaging quality.

Embodiment 5

An optical imaging lens assembly according to Embodiment 5 of the present disclosure is described below with reference to FIGS. 9 to 10D. FIG. 9 is a schematic structural diagram of the optical imaging lens assembly according to Embodiment 5 of the present disclosure.

As shown in FIG. 9, the optical imaging lens assembly includes, sequentially from an object side to an image side, a stop STO, a first lens E1, a second lens E2, a third lens E3, a fourth lens E4, a fifth lens E5, a sixth lens E6, a seventh lens E7, an optical filter E8 and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the surfaces S1 to S16 and finally forms an image on the image plane S17.

In this embodiment, a total effective focal length f of the optical imaging lens assembly is 5.96 mm, and a maximal field-of-view FOV of the optical imaging lens assembly is 80.5°.

Table 9 is a table showing basic parameters of the optical imaging lens assembly in Embodiment 5. Here, the units of a radius of curvature, a thickness/distance and a focal length are millimeters (mm). Table 10 show the high-order coefficients applicable to the aspheric surfaces in Embodiment 5. Here, the surface type of each aspheric surface may be defined using the formula (1) given in Embodiment 1.

TABLE 9

| surface number | surface type | radius of curvature | Thickness/distance | refractive index | abbe number | focal length | conic coefficient |
|---|---|---|---|---|---|---|---|
| OBJ | spherical | infinite | infinite | | | | |
| STO | spherical | infinite | −0.6700 | | | | |
| S1 | aspheric | 2.9909 | 1.4315 | 1.546 | 55.97 | 6.98 | 0.0089 |
| S2 | aspheric | 33.1248 | 0.0357 | | | | 0.0000 |
| S3 | aspheric | 15.0541 | 0.3400 | 1.687 | 18.14 | −32.13 | 26.4951 |
| S4 | aspheric | 8.8677 | 0.4734 | | | | 1.6603 |
| S5 | aspheric | 72.6832 | 0.6446 | 1.546 | 55.97 | 19.78 | −79.8292 |
| S6 | aspheric | −12.6387 | 0.0302 | | | | 25.8196 |
| S7 | aspheric | 78.2197 | 0.3400 | 1.678 | 19.24 | −30.70 | −99.0000 |
| S8 | aspheric | 16.4003 | 0.4630 | | | | −86.5081 |
| S9 | aspheric | −8.7923 | 0.8773 | 1.546 | 55.97 | 21.36 | −7.6547 |
| S10 | aspheric | −5.1888 | 0.0250 | | | | −0.3016 |
| S11 | aspheric | 4.0635 | 0.6379 | 1.546 | 55.97 | 12.87 | 0.3572 |
| S12 | aspheric | 9.1054 | 0.7801 | | | | 1.9977 |
| S13 | aspheric | 7.3397 | 0.6000 | 1.537 | 55.62 | −5.52 | 1.2489 |
| S14 | aspheric | 2.0518 | 0.3822 | | | | −5.7758 |
| S15 | spherical | infinite | 0.2600 | 1.518 | 64.17 | | |
| S16 | spherical | infinite | 0.6000 | | | | |
| S17 | spherical | infinite | | | | | |

TABLE 10

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | −1.3052E−02 | −2.7998E−03 | −1.0843E−03 | −2.1487E−04 | −9.7258E−05 | 2.8991E−06 | 5.2012E−06 | 0.0000E+00 | 0.0000E+00 |
| S2 | 3.5917E−02 | 1.2670E−02 | 4.9720E−04 | 3.3471E−04 | −2.3952E−04 | −6.7573E−04 | 2.3943E−04 | 0.0000E+00 | 0.0000E+00 |
| S3 | −7.0025E−02 | 1.6221E−02 | 1.1997E−03 | 1.1745E−05 | 2.5123E−04 | −1.6645E−04 | −7.0395E−05 | 5.7844E−06 | −2.6112E−06 |
| S4 | −1.6175E−02 | 1.6036E−03 | 4.7436E−04 | 1.1319E−04 | 8.4156E−05 | 8.3068E−06 | 5.2417E−06 | 1.0512E−06 | −7.8844E−08 |
| S5 | −1.2348E−01 | −1.7387E−02 | −2.7740E−05 | 3.3210E−04 | −2.3751E−05 | 2.9585E−05 | −7.7624E−06 | 9.6423E−06 | 4.7893E−06 |
| S6 | −1.3121E−01 | −5.3423E−02 | 1.3472E−02 | −3.7095E−03 | 1.6409E−03 | −1.3128E−03 | 5.7900E−04 | −6.8222E−05 | −3.0047E−06 |
| S7 | −2.4350E−01 | −3.2715E−02 | 1.2886E−02 | −4.0382E−03 | 2.2206E−03 | −1.1915E−03 | 5.1701E−04 | −1.4784E−06 | −3.7470E−05 |
| S8 | −3.0419E−01 | 4.5651E−03 | 1.8752E−02 | 1.9691E−03 | 3.7981E−03 | −3.5808E−04 | 1.6207E−04 | −1.5800E−04 | −9.0909E−05 |
| S9 | 6.6366E−02 | −7.9832E−02 | 3.4807E−02 | −6.6946E−03 | 2.2115E−03 | −8.1589E−04 | −8.6578E−05 | −9.6195E−05 | 5.1490E−05 |
| S10 | −1.7891E−02 | 5.9554E−02 | 4.4345E−02 | −3.6928E−02 | 5.9324E−03 | −6.9540E−04 | 1.2886E−03 | −6.2515E−04 | 9.9779E−05 |
| S11 | −2.5301E+00 | 1.3684E−02 | 1.6813E−01 | −3.7574E−02 | −3.8082E−03 | 2.4800E−03 | −1.2796E−03 | −1.8479E−03 | 9.6892E−04 |
| S12 | −1.8830E+00 | −5.2956E−02 | −1.5529E−04 | −3.9397E−02 | 2.9213E−02 | 8.1881E−03 | −9.8011E−03 | 5.1517E−03 | −1.9338E−04 |
| S13 | −3.4143E+00 | 1.2447E+00 | −6.0233E−01 | 2.5901E−01 | −1.0779E−01 | 1.0305E−02 | 2.4999E−04 | −1.7816E−03 | −1.4643E−03 |
| S14 | −2.9927E+00 | 7.6963E−01 | −2.4028E−01 | 1.3410E−01 | −8.1149E−02 | −4.8474E−03 | −2.1886E−02 | −6.4714E−03 | −5.7977E−03 |

Figure 10C:
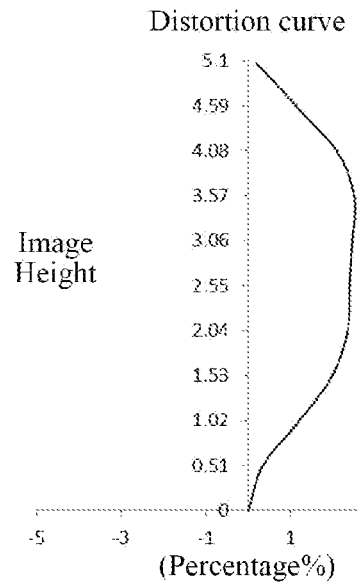
Figure 10D:
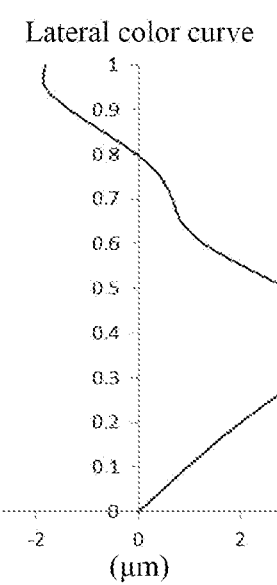

FIG. 10A illustrates a longitudinal aberration curve of the optical imaging lens assembly according to Embodiment 5, representing deviations of focal points of light of different wavelengths converged after passing through the lens assembly. FIG. 10B illustrates an astigmatic curve of the optical imaging lens assembly according to Embodiment 5, representing a curvature of a tangential image plane and a curvature of a sagittal image plane. FIG. 10C illustrates a distortion curve of the optical imaging lens assembly according to Embodiment 5, representing amounts of distortion corresponding to different image heights. FIG. 10D illustrates a lateral color curve of the optical imaging lens assembly according to Embodiment 5, representing deviations of different image heights on the image plane after light passes through the lens assembly. It can be seen from FIGS. 10A to 10D that the optical imaging lens assembly given in Embodiment 5 can achieve a good imaging quality.

Embodiment 6

Figure 11:
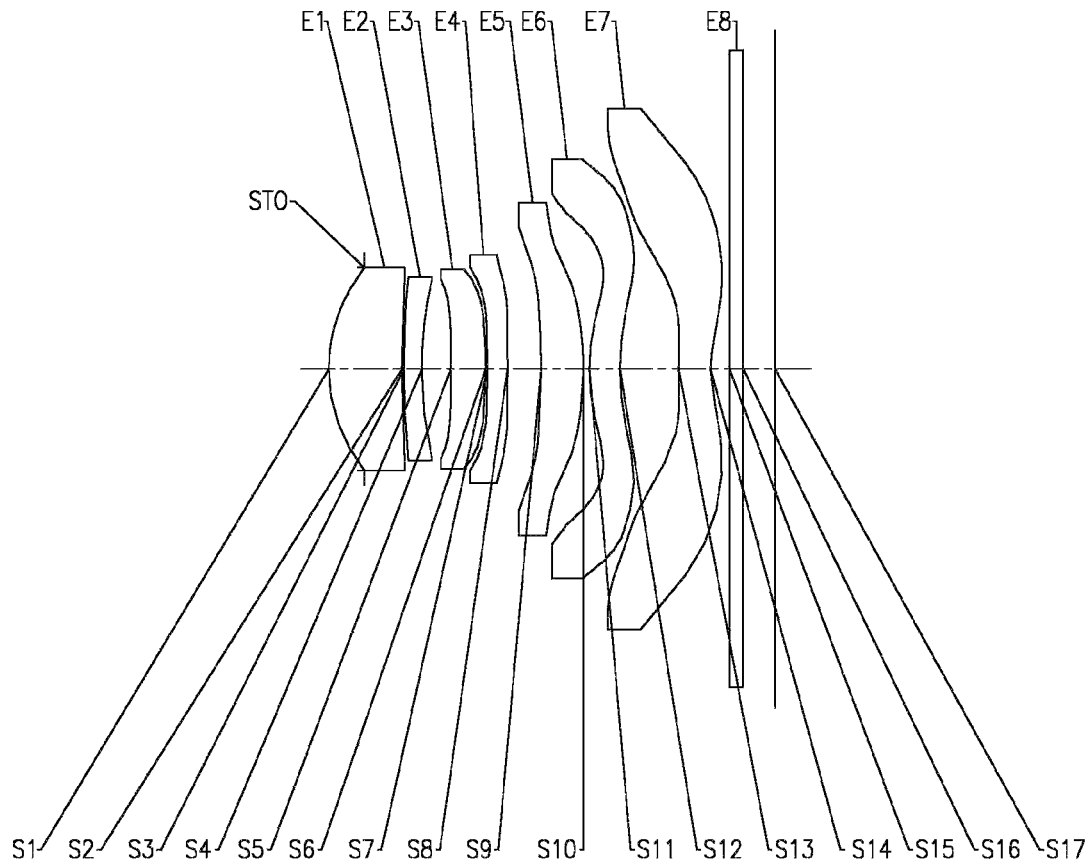
FIG. 11 is a schematic structural diagram of an optical imaging lens assembly according to Embodiment 6 of the present disclosure.

An optical imaging lens assembly according to Embodiment 6 of the present disclosure is described below with reference to FIGS. 11 to 12D. FIG. 11 is a schematic structural diagram of the optical imaging lens assembly according to Embodiment 6 of the present disclosure.

As shown in FIG. 11, the optical imaging lens assembly includes, sequentially from an object side to an image side, a stop STO, a first lens E1, a second lens E2, a third lens E3, a fourth lens E4, a fifth lens E5, a sixth lens E6, a seventh lens E7, an optical filter E8 and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a concave surface, and an image-side surface S6 of the third lens E3 is a convex surface. The fourth lens E4 has a negative refractive power, an object-side surface S7 of the fourth lens E4 is a concave surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the surfaces S1 to S16 and finally forms an image on the image plane S17.

In this example, a total effective focal length f of the optical imaging lens assembly is 6.82 mm, and a maximal field-of-view FOV of the optical imaging lens assembly is 80.1°.

Table 11 is a table showing basic parameters of the optical imaging lens assembly in Embodiment 6. Here, the units of a radius of curvature, a thickness/distance and a focal length are millimeters (mm). Table 12 show the high-order coefficients applicable to the aspheric surfaces in Embodiment 6. Here, the surface type of each aspheric surface may be defined using the formula (1) given in Embodiment 1.

TABLE 11

| surface number | surface type | radius of curvature | Thickness/ distance | material refractive index | abbe number | focal length | conic coefficient |
|---|---|---|---|---|---|---|---|
| OBJ | spherical | infinite | infinite | | | | |
| STO | spherical | infinite | −0.6700 | | | | |
| S1 | aspheric | 3.0525 | 1.3805 | 1.546 | 55.97 | 7.09 | 0.0448 |
| S2 | aspheric | 30.3193 | 0.0361 | | | | 0.0000 |
| S3 | aspheric | 11.8357 | 0.3400 | 1.687 | 18.14 | −30.03 | 25.1601 |
| S4 | aspheric | 7.4330 | 0.5450 | | | | 6.8525 |
| S5 | aspheric | −61.7955 | 0.6608 | 1.546 | 55.97 | 17.27 | −51.3169 |
| S6 | aspheric | −8.2078 | 0.0308 | | | | 6.4608 |
| S7 | aspheric | −26.9964 | 0.3800 | 1.678 | 19.24 | −20.15 | 12.4632 |
| S8 | aspheric | 27.7744 | 0.6323 | | | | −78.8502 |
| S9 | aspheric | −10.4870 | 0.7997 | 1.546 | 55.97 | 16.19 | −7.5593 |
| S10 | aspheric | −4.9252 | 0.1128 | | | | −0.8249 |
| S11 | aspheric | 4.1841 | 0.5763 | 1.546 | 55.97 | 34.63 | 0.3572 |
| S12 | aspheric | 5.1121 | 1.1086 | | | | −0.4421 |
| S13 | aspheric | 7.2679 | 0.6000 | 1.546 | 55.97 | −5.73 | 1.0201 |
| S14 | aspheric | 2.1235 | 0.3581 | | | | −7.4144 |
| S15 | spherical | infinite | 0.2600 | 1.518 | 64.17 | | |
| S16 | spherical | infinite | 0.6000 | | | | |
| S17 | spherical | infinite | | | | | |

TABLE 12

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1  | −6.8077E−03 | −2.2553E−03 | −1.0715E−03 | −2.2339E−04 | −9.2307E−05 |  9.7920E−06 | −9.5379E−06 |  0.0000E+00 |  0.0000E+00 |
| S2  |  4.1937E−02 | −3.1591E−03 |  1.0867E−02 | −5.9799E−04 | −1.9019E−04 |  7.0931E−04 | −3.8437E−04 |  0.0000E+00 |  0.0000E+00 |
| S3  | −8.7931E−02 |  1.9923E−02 | −2.3386E−03 |  5.9722E−05 | −1.1635E−04 | −1.9099E−05 |  6.6420E−05 |  2.5798E−06 |  1.2935E−07 |
| S4  | −3.3307E−02 |  5.7879E−03 |  7.3726E−04 |  2.1052E−04 | −5.4977E−06 | −1.2902E−05 |  1.1006E−05 |  2.3242E−06 |  3.9143E−06 |
| S5  | −1.4768E−01 | −1.9427E−02 |  4.7576E−04 |  1.1522E−04 | −1.5809E−04 | −6.2700E−05 | −2.7475E−05 |  1.6155E−05 |  7.1076E−06 |
| S6  | −1.1681E−01 | −5.9031E−02 |  1.3097E−02 | −5.6882E−03 |  1.4746E−03 | −1.1794E−03 |  2.6915E−04 | −4.9493E−05 |  8.8985E−05 |
| S7  | −2.3816E−01 | −2.7935E−02 |  1.1853E−02 | −5.2113E−03 |  2.3314E−03 | −1.0115E−03 |  2.1051E−04 | −8.4338E−05 |  5.3953E−05 |
| S8  | −3.2951E−01 |  2.9620E−02 |  1.4578E−02 |  2.0642E−03 |  2.5880E−03 | −1.9113E−04 | −7.1518E−05 | −7.1166E−05 | −1.9995E−05 |
| S9  | −9.3865E−02 | −4.6091E−02 |  4.4870E−02 | −1.8684E−02 |  5.2683E−04 |  7.0501E−04 |  2.4441E−04 | −1.1877E−04 |  1.7221E−04 |
| S10 |  2.5504E−01 |  8.6815E−02 |  2.0957E−02 | −6.1060E−02 |  2.0270E−02 |  2.5321E−03 | −1.2907E−03 | −2.0549E−03 |  1.1290E−03 |
| S11 | −2.7205E+00 | −2.5148E−02 |  1.5423E−01 | −2.1314E−02 |  7.7947E−03 | −1.0054E−02 | −8.3109E−03 |  2.5571E−04 |  2.6771E−03 |
| S12 | −2.4396E+00 |  1.9874E−02 | −6.2820E−03 | −2.7210E−02 |  5.2801E−02 |  9.8066E−03 | −7.3064E−03 |  1.7449E−03 | −4.2371E−03 |
| S13 | −4.2099E+00 |  1.3293E+00 | −6.0787E−01 |  2.8093E−01 | −8.7568E−02 |  1.0279E−02 | −1.4701E−02 |  1.5475E−02 | −5.4857E−03 |
| S14 | −3.5938E+00 |  7.6080E−01 | −2.3419E−01 |  1.2988E−01 | −4.9342E−02 |  3.0678E−02 | −5.6813E−03 |  3.4054E−03 | −7.0264E−03 |

Figure 12A:
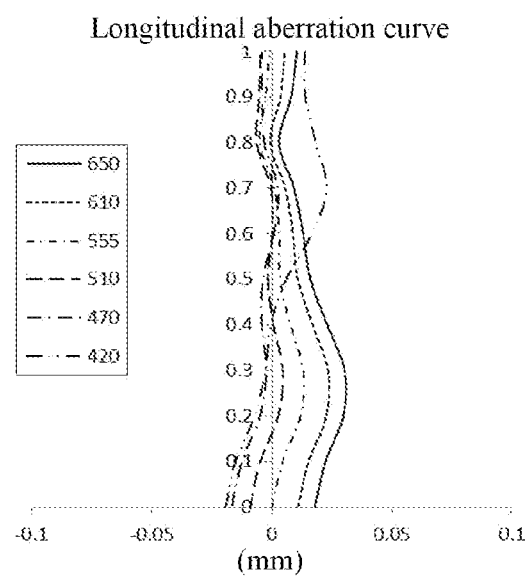
FIGS. 12A to 12D respectively show a longitudinal aberration curve, an astigmatic curve, a distortion curve and a lateral color curve of the optical imaging lens assembly according to Embodiment 6.
Figure 12B:
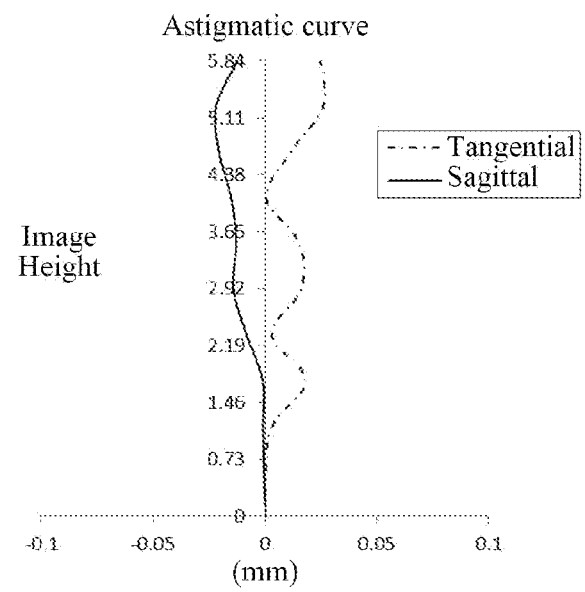
Figure 12C:
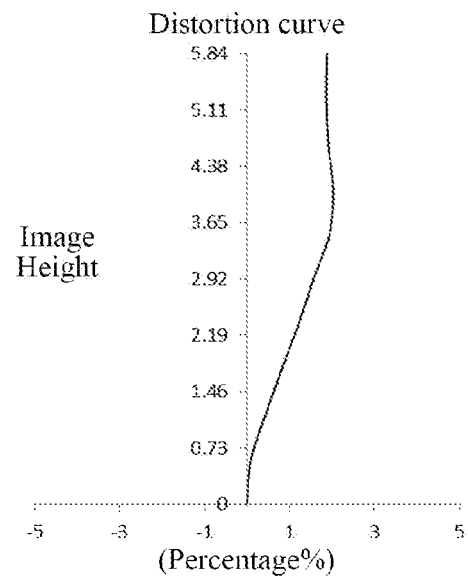
Figure 12D:
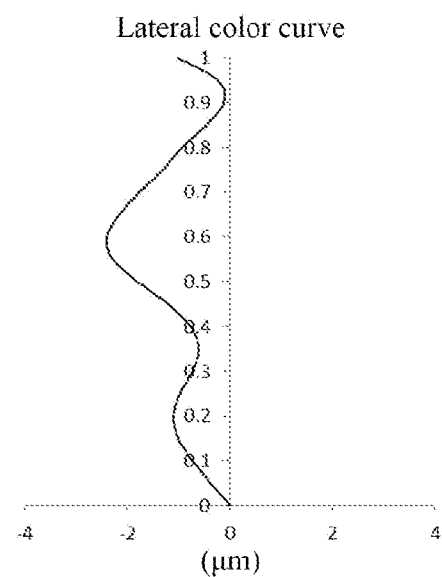

FIG. 12A illustrates a longitudinal aberration curve of the optical imaging lens assembly according to Embodiment 6, representing deviations of focal points of light of different wavelengths converged after passing through the lens assembly. FIG. 12B illustrates an astigmatic curve of the optical imaging lens assembly according to Embodiment 6, representing a curvature of a tangential image plane and a curvature of a sagittal image plane. FIG. 12C illustrates a distortion curve of the optical imaging lens assembly according to Embodiment 6, representing amounts of distortion corresponding to different image heights. FIG. 12D illustrates a lateral color curve of the optical imaging lens assembly according to Embodiment 6, representing deviations of different image heights on the image plane after light passes through the lens assembly. It can be seen from FIGS. 12A to 12D that the optical imaging lens assembly given in Embodiment 6 can achieve a good imaging quality.

In summary, Embodiments 1-6 respectively satisfy the relationships shown in Table 13.

TABLE 13

| conditional expression | embodiment | | | | | |
|---|---|---|---|---|---|---|
|  | 1 | 2 | 3 | 4 | 5 | 6 |
| f × tan(Semi-FOV) (mm) | 5.72 | 5.59 | 5.66 | 5.17 | 5.04 | 5.74 |
| CT1/ET1 | 1.81 | 1.88 | 1.63 | 1.79 | 1.79 | 1.82 |
| EPD/CT1 | 2.69 | 2.78 | 2.30 | 2.67 | 2.68 | 2.78 |
| ImgH/TTL | 0.74 | 0.72 | 0.73 | 0.65 | 0.64 | 0.69 |
| f7/(R13-R14) | −1.08 | −0.99 | −0.86 | −1.02 | −1.04 | −1.11 |
| f6/R11-f6/R12 | 1.55 | 1.67 | 1.68 | 1.74 | 1.75 | 1.50 |
| f12/f1 | 1.25 | 1.24 | 1.12 | 1.34 | 1.40 | 1.27 |
| f2/f3 | −1.55 | −1.61 | −1.87 | −1.79 | −1.62 | −1.74 |
| \|f/f5-f/f6\| | 0.16 | 0.05 | 0.05 | 0.17 | 0.18 | 0.22 |
| f56/f7 | −2.14 | −2.27 | −2.68 | −1.57 | −1.41 | −1.86 |
| (T56 + CT6)/SAG62 | −0.66 | −0.76 | −0.66 | −0.73 | −0.78 | −0.97 |
| CT5/(SAG61 + T56) | −0.91 | −0.98 | −0.83 | −1.11 | −1.30 | −1.33 |
| SAG71/T67 | −1.22 | −1.35 | −1.52 | −1.39 | −1.28 | −1.21 |
| CT3/CT4 | 1.69 | 1.78 | 1.76 | 1.92 | 1.90 | 1.74 |
| (T23 + T45 + T67)/ΣAT | 0.93 | 0.92 | 0.88 | 0.95 | 0.95 | 0.93 |
| f5/R9 + f5/R10 | −6.62 | −9.12 | −10.51 | −7.19 | −6.55 | −4.83 |

Embodiments of the present disclosure further provide an imaging apparatus having an electronic photosensitive element which may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, for example, technical solutions formed by replacing the features as disclosed in the present disclosure with (but not limited to) technical features with similar functions.

What is claimed is:

1. An optical imaging lens assembly, comprising, sequentially along an optical axis from an object side to an image side:
   a first lens, having a positive refractive power;
   a second lens, having a negative refractive power;
   a third lens, having a positive refractive power;
   a fourth lens, having a negative refractive power;
   a fifth lens, having a positive refractive power;
   a sixth lens, having a positive refractive power; and
   a seventh lens, having a negative refractive power,
   wherein a total effective focal length f of the optical imaging lens assembly and half of a maximal field-of-view Semi-FOV of the optical imaging lens assembly satisfy: f×tan(Semi-FOV)≥5.0 mm;
   an effective focal length f7 of the seventh lens, a radius of curvature R13 of the object-side surface of the seventh lens, and a radius of curvature R14 of the image-side surface of the seventh lens satisfy: −1.5<f7/(R13−R14)<−0.5; and
   a center thickness CT1 of the first lens on the optical axis and an edge thickness ET1 of the first lens satisfy: 1.5<CT1/ET1<2.0.

2. The optical imaging lens assembly according to claim 1, wherein an entrance pupil diameter EPD of the optical imaging lens assembly and a center thickness CT1 of the first lens on the optical axis satisfy: 2.3≤EPD/CT1<3.0.

3. The optical imaging lens assembly according to claim 1, wherein an effective focal length f6 of the sixth lens, a radius of curvature R11 of the object-side surface of the sixth lens, and a radius of curvature R12 of the image-side surface of the sixth lens satisfy: $1.5<f6/R11-f6/R12<2.0$.

4. The optical imaging lens assembly according to claim 1, wherein an effective focal length f1 of the first lens and a combined focal length f12 of the first lens and the second lens satisfy: $1.0<f12/f1<1.5$.

5. The optical imaging lens assembly according to claim 1, wherein an effective focal length f2 of the second lens and an effective focal length f3 of the third lens satisfy: $-2.0<f2/f3\leq-1.5$.

6. The optical imaging lens assembly according to claim 1, wherein a total effective focal length f of the optical imaging lens assembly, an effective focal length f5 of the fifth lens, and an effective focal length f6 of the sixth lens satisfy: $|f/f5-f/f6|<0.3$.

7. The optical imaging lens assembly according to claim 1, wherein a combined focal length f56 of the fifth lens and the sixth lens and the effective focal length f7 of the seventh lens satisfy: $-3.0<f56/f7\leq-1.4$.

8. The optical imaging lens assembly according to claim 1, wherein a center thickness CT6 of the sixth lens on the optical axis, a spacing distance T56 between the fifth lens and the sixth lens on the optical axis, and a distance SAG62 on the optical axis from an intersection point of an image-side surface of the sixth lens and the optical axis to a vertex of a maximal effective radius of the image-side surface of the sixth lens satisfy: $-1.0\leq(T56+CT6)/SAG62<-0.5$.

9. The optical imaging lens assembly according to claim 1, wherein a center thickness CT5 of the fifth lens on the optical axis, a spacing distance T56 between the fifth lens and the sixth lens on the optical axis, and a distance SAG61 on the optical axis from an intersection point of an object-side surface of the sixth lens and the optical axis to a vertex of a maximal effective radius of the object-side surface of the sixth lens satisfy: $-1.5<CT5/(SAG61+T56)\leq-0.8$.

10. The optical imaging lens assembly according to claim 1, wherein a distance SAG71 on the optical axis from an intersection point of an object-side surface of the seventh lens and the optical axis to a vertex of a maximal effective radius of the object-side surface of the seventh lens and a spacing distance T67 between the sixth lens and the seventh lens on the optical axis satisfy: $-1.6<SAG71/T67\leq-1.2$.

11. The optical imaging lens assembly according to claim 1, wherein a center thickness CT3 of the third lens on the optical axis and a center thickness CT4 of the fourth lens on the optical axis satisfy: $1.6<CT3/CT4<2.0$.

12. The optical imaging lens assembly according to claim 1, wherein a spacing distance T23 between the second lens and the third lens on the optical axis, a spacing distance T45 between the fourth lens and the fifth lens on the optical axis, a spacing distance T67 between the sixth lens and the seventh lens on the optical axis, and a sum EAT of spacing distances between any two adjacent lenses in the first to seventh lenses on the optical axis satisfy: $0.8<(T23+T45+T67)/\Sigma AT<1.0$.

13. The optical imaging lens assembly according to claim 1, wherein an effective focal length f5 of the fifth lens, a radius of curvature R9 of the object-side surface of the fifth lens, and a radius of curvature R10 of the image-side surface of the fifth lens satisfy: $-11.0<f5/R9+f5/R10<-4.5$.

14. The optical imaging lens assembly according to claim 1, wherein a distance TTL from the object-side surface of first lens to the image plane of the optical imaging lens assembly on the optical axis and half of a diagonal length ImgH of an effective pixel area on the image plane of the optical imaging lens assembly satisfy: $ImgH/TTL>0.6$.

15. An optical imaging lens assembly, comprising, sequentially along an optical axis from an object side to an image side:

a first lens, having a positive refractive power;
a second lens, having a negative refractive power;
a third lens, having a positive refractive power;
a fourth lens, having a negative refractive power;
a fifth lens, having a positive refractive power;
a sixth lens, having a positive refractive power; and
a seventh lens, having a negative refractive power,
wherein a total effective focal length f of the optical imaging lens assembly and half of a maximal field-of-view Semi-FOV of the optical imaging lens assembly satisfy: $f\times\tan(Semi\text{-}FOV)\geq5.0$ mm;
an effective focal length f7 of the seventh lens, a radius of curvature R13 of the object-side surface of the seventh lens, and a radius of curvature R14 of the image-side surface of the seventh lens satisfy: $-1.5<f7/(R13-R14)<-0.5$; and
a spacing distance T23 between the second lens and the third lens on the optical axis, a spacing distance T45 between the fourth lens and the fifth lens on the optical axis, a spacing distance T67 between the sixth lens and the seventh lens on the optical axis, and a sum EAT of spacing distances between any two adjacent lenses in the first to seventh lenses on the optical axis satisfy: $0.8<(T23+T45+T67)/\Sigma AT<1.0$.

\* \* \* \* \*